United States Patent [19]

Nakawaki et al.

[11] Patent Number: 5,287,773
[45] Date of Patent: Feb. 22, 1994

[54] APPARATUS FOR CONTROLLING ENGINE BRAKE FORCE DURING VEHICLE RUNNING ON DOWNHILL WITH RELEASED ACCELERATOR

[75] Inventors: Yasunori Nakawaki, Susono; Yoshio Shindo, Numazu; Yasuhiko Higashiyama, Susono, all of Japan

[73] Assignee: Toyota Jidosha Kabushiki Kaisha, Toyota, Japan

[21] Appl. No.: 11,467

[22] Filed: Jan. 28, 1993

[30] Foreign Application Priority Data

Jan. 31, 1992 [JP] Japan ............... 4-046111
Jan. 31, 1992 [JP] Japan ............... 4-046112
Jan. 31, 1992 [JP] Japan ............... 4-046113

[51] Int. Cl.$^5$ .................................. F16H 61/02
[52] U.S. Cl. .................................. 74/859; 74/857
[58] Field of Search ...................... 74/857, 859

[56] References Cited

U.S. PATENT DOCUMENTS

| | | | |
|---|---|---|---|
| 3,640,156 | 2/1972 | Mori et al. | 74/866 |
| 3,684,066 | 8/1972 | Kubo et al. | 192/4 A |
| 3,713,351 | 1/1973 | Sakakibara et al. | 74/645 |
| 4,262,783 | 4/1981 | Scarrott et al. | 192/0.09 |
| 4,350,234 | 9/1982 | Suga et al. | 192/4 A |
| 4,473,882 | 9/1984 | Suzuki et al. | 364/424.1 |
| 4,561,327 | 12/1985 | Niwa et al. | 74/866 |
| 4,697,478 | 10/1987 | Mastumoto et al. | 74/859 |
| 4,720,792 | 1/1988 | Kasai et al. | 364/424.1 |
| 4,913,006 | 4/1990 | Tsuyama et al. | 74/866 |
| 5,012,418 | 4/1991 | Petzold | 364/426.04 |
| 5,023,792 | 6/1991 | Shioyama | 364/426.04 |
| 5,044,230 | 9/1991 | Shinya et al. | 74/866 |
| 5,203,235 | 4/1993 | Iizuka | 74/866 |

FOREIGN PATENT DOCUMENTS 61-103044 5/1986 Japan .
62-246650 10/1987 Japan .
1-193436 8/1989 Japan .

*Primary Examiner*—Dirk Wright
*Attorney, Agent, or Firm*—Oblon, Spivak, McClelland, Maier & Neustadt

[57] ABSTRACT

An apparatus for controlling the engine brake of a motor vehicle, adapted to control the intake air quantity of the engine so as to maintain the actual vehicle speed at a desired speed. The apparatus includes a device for avoiding acceleration of the vehicle during running on a downhill with the accelerator pedal released, and a device to permit deceleration of the vehicle during the subsequent running on an uphill road. The apparatus may include a device for increasing the engine brake force when the brake pedal is depressed, by fully closing the throttle valve and/or shifting down the transmission, to assure sufficient engine braking effect upon depression of the brake pedal on a downhill. The apparatus may include a device for updating the desired vehicle speed when the actual speed is lowered by depression of the brake pedal, to prevent acceleration of the vehicle after the brake pedal is released at the end of a downhill. The desired vehicle speed may be updated when the difference between the initially determined desired speed and the actual speed exceeds a given limit, or when the brake pedal is released.

31 Claims, 17 Drawing Sheets

FIG.3

| SHIFT LEVER POSITION | GEAR POSITION | SOLENOIDS | | | CLUTCHES | | | BRAKES | | | |
|---|---|---|---|---|---|---|---|---|---|---|---|
| | | S1 | S2 | S3 | C0 | C1 | C2 | B0 | B1 | B2 | B3 |
| D | 1ST | O | | | O | O | | | | | |
| | 2ND | O | O | | O | O | | | | O | |
| | 3RD | | O | | O | O | O | | | O | |
| | O/D | | | | | O | O | O | | O | |
| | (1ST) | O | | O | O | O | | | | | O |
| | (2ND) | O | O | O | O | O | | | O | O | |
| S | 1ST | O | | | O | O | | | | | |
| | 2ND | O | O | O | O | O | | | O | O | |
| | 3RD | | O | | O | O | O | | | O | |
| L | 1ST | O | | O | O | O | | | | | O |
| | 2ND | O | O | O | O | O | | | O | O | |

FIG.10

| GEAR POSITION \ V | 40 | 50 | 60 | 70 | 80 | 90 | 100 |
|---|---|---|---|---|---|---|---|
| O/D | TH41 | TH42 | TH43 | TH44 | TH45 | TH46 | TH47 |
| 3RD | TH31 | TH32 | TH33 | TH34 | TH35 | TH36 | TH37 |
| 2ND(S3 ON) | TH21 | TH22 | TH23 | TH24 | TH25 | TH26 | TH27 |
| 1ST(S3 ON) | TH11 | TH12 | TH13 | TH14 | TH15 | TH16 | TH17 |

APPARATUS FOR CONTROLLING ENGINE BRAKE FORCE DURING VEHICLE RUNNING ON DOWNHILL WITH RELEASED ACCELERATOR

BACKGROUND OF THE INVENTION

1. Field of the Invention

The present invention relates in general to an apparatus for controlling an engine brake force of a vehicle equipped with an automatic transmission, and more particularly to such an engine brake force control apparatus capable of increasing the engine brake force when the vehicle is accelerated on a downhill with the accelerator pedal released, and/or controlling the engine brake force when the brake pedal is depressed after the accelerator pedal is released during running on a downhill.

2. Discussion of the Related Art

Generally, an automatic transmission of a motor vehicle is controlled so that the speed ratio of the transmission is changed in steps or continuously on the basis of the operating amount of the accelerator pedal and the opening of the throttle valve of the engine. An example of a shift pattern data map for shifting the automatic transmission having four forward-drive gear positions is illustrated in FIG. 9. This data map indicates shift-up and shift-down boundaries which are relationships between the operating amount of the accelerator pedal and the throttle opening. The solid lines in FIG. 9 show the shift-up boundaries, while the broken lines show the shift-down boundaries. According to this shift pattern data map, the transmission is shifted up depending upon the vehicle running speed, even when the operating amount of the accelerator pedal is zero, that is, when the accelerator pedal is in the released position. Therefore, the transmission may be shifted up when the driver releases the accelerator pedal during running of the vehicle on a downhill and the vehicle speed rises without a sufficient engine brake force applied. This shift-up action of the transmission further reduces the engine brake force, and tends to accelerate the vehicle. To solve this problem, the assignee of the present application proposed an engine brake force control apparatus as disclosed in Japanese Patent Application No. 3-352773 which has not been laid open at the time the present invention was made. In the proposed apparatus, the actual vehicle speed at the time the accelerator pedal is released by the driver to avoid acceleration of the vehicle is used as the desired vehicle speed, and the throttle opening is reduced to control the engine brake force such that the actual vehicle speed will not exceed the desired speed.

It was found, however, that the mere controlling the engine brake force for the vehicle speed not to exceed the desired speed may suffer from reduction of the vehicle speed unexpected to the vehicle driver, due to an excessive engine brake force, when the gradient of the downhill road is reduced. To avoid this phenomenon, the engine brake force should be controlled by increasing or decreasing the throttle opening so that the actual vehicle speed is made equal to the desired speed.

In the proposed control apparatus described above, the throttle opening is controlled to maintain the actual vehicle speed at or near the desired speed, even when the road gradient is changed from a downhill to an uphill. Usually, the driver expects some deceleration of the vehicle after the vehicle begins to run on the uphill. However, the above arrangement maintains the vehicle speed at the constant desired level, unexpectedly to the driver. That is, the driver expects that the acceleration of the vehicle is prevented or restricted by an engine brake force applied thereto when the accelerator pedal is released during running on a downhill, and also expects that the vehicle is decelerated on an uphill, but does not expect constant-speed running of the vehicle during the uphill running as achieved by an automatic cruising device.

The proposed control apparatus also suffers from a problem that when the driver depresses the brake pedal to further decelerate the vehicle after the accelerator pedal is released. In this case, the engine brake force will not be increased after the actual vehicle speed is lowered down to the desired speed, whereas the driver's desire to decelerate the vehicle is still large. Accordingly, the driver has to rely on the brake force produced by the brake pedal depressed by the driver. Thus, the initial depression of the brake pedal eventually requires an increased depressing force acting on the brake pedal, due to an insufficient engine braking effect during running of the vehicle with the accelerator pedal released. In some case, the engine produces a forward drive force, with no engine brake applied to the vehicle.

The proposed control apparatus further suffers from a problem that when the driver releases the brake pedal after the vehicle speed is lowered to a level desired by the driver, the engine brake force may not be sufficient, result in the vehicle speed rising back to the desired speed at the time the accelerator pedal was released. For example, when the driver depresses the brake pedal to decelerate the vehicle during running on a straight downhill and releases the brake pedal shortly before the lower end of the downhill which precedes a curve, the vehicle will be accelerate during the subsequent running along the curve, requiring the driver to again depress the brake pedal. Thus, the proposed apparatus is not satisfactory in terms of the ease of control of the vehicle equipped with an automatic transmission.

SUMMARY OF THE INVENTION

It is therefore a first object of the present invention to provide an apparatus for controlling the engine brake force of a motor vehicle, which is capable of optimizing the engine brake force during running of the vehicle on a downhill, irrespective of the gradient of the downhill, and lowering the vehicle speed during the subsequent running of the vehicle on an uphill, according to the gradient of the uphill.

It is a second object of the present invention to provide an apparatus for controlling the engine brake force of a motor vehicle, which is capable of decelerating the vehicle with an increased engine brake force when the driver depressed the brake pedal after releasing of the accelerator pedal to further decelerate the vehicle.

It is a third object of the present invention to provide an apparatus for controlling the engine brake force of a motor vehicle, which is capable of optimizing the engine brake force according to the vehicle speed at the time the brake pedal is released, where the brake pedal is released after the vehicle is decelerated by depression of the brake pedal while the accelerator pedal is in the released state.

The above first object may be achieved according to one aspect of this invention, which provides an apparatus for controlling an engine brake force of a motor vehicle produced by an engine of the vehicle when an accelerator pedal of the vehicle is in a released state, the vehicle having an automatic transmission which is shifted to change the speed ratio according to predetermined shifting conditions, comprising: (a) an accelerator position sensor for detecting an operating amount of the accelerator pedal; (b) a vehicle speed sensor for detecting an actual running speed of the vehicle; (c) desired-speed determining means for determining whether the operating amount of the accelerator pedal detected by the accelerator position sensor is reduced below a predetermined threshold which is close to zero, and determining a desired speed of the vehicle on the basis of the actual running speed detected by the vehicle speed sensor when the operating amount of the accelerator pedal is reduced below said predetermined threshold; (d) intake air control means for controlling an intake air quantity of the engine such that the actual running speed approaches the desired speed; and (e) limiting means for limiting the intake air quantity controlled by the intake air control means, to a value not exceeding a reference value which is determined on the basis of the speed ratio of the automatic transmission and the actual running speed of the vehicle, so as to permit the actual running speed to be maintained at the desired speed when the vehicle runs on a level road surface.

In the engine brake force control apparatus of the present invention constructed as described above, the desired speed of the vehicle is determined by the desired-speed determining means, on the basis of the actual running speed detected by the vehicle speed sensor when the operating amount of the accelerator pedal detected by the accelerator position sensor is reduced below the predetermined threshold. The determined desired vehicle speed is utilized by the intake air control means to increase or decrease the intake air quantity of the engine so that the actual running speed of the vehicle approaches or coincides with the determined desired speed. When the driver releases the accelerator pedal to avoid further acceleration of the vehicle during running of the vehicle on a downhill, the desired vehicle speed is determined on the basis of the actual vehicle speed when the accelerator pedal is released, and the engine brake force is controlled by regulating the intake air quantity so that the actual speed is maintained at the determined desired speed. Thus, the present apparatus assures optimum control of the engine braking effect during running of the vehicle on a downhill road, irrespective of a variation in the gradient of the road surface, as expected by the vehicle driver, without the driver's further manipulation of the accelerator pedal and/or manipulation of the brake pedal.

However, if the intake air quantity controlled by the intake air control means exceeds the reference value which permits the actual vehicle speed to be maintained at the desired speed if the vehicle runs on a level road surface, the intake air quantity is limited down to the reference value. If a downhill road is followed by an uphill road, the intake air quantity as obtained by the intake air control means exceeds the reference value when the vehicle begins to run up the uphill, but is limited to this reference value. Since the reference intake air quantity is not sufficient to maintain the actual vehicle speed at or near the desired speed during running of the vehicle on the uphill, the actual speed is lowered according to the gradient of the uphill road surface, as expected by the vehicle driver.

Thus, the present apparatus assures optimum control of the engine brake force during running of the vehicle on a downhill with the accelerator pedal placed in the released state, irrespective of a variation in the gradient of the downhill road surface, while at the same time permits suitable reduction in the actual running speed of the vehicle on the following uphill road according to the gradient of the uphill road surface. Thus, the apparatus is capable of controlling the engine brake force and the vehicle speed as expected by the driver, when the vehicle is running on the downhill and the following uphill, with the accelerator pedal being released.

The intake air control means may include a throttle valve or a valve for controlling the idling speed of the engine, and an electronic control device for controlling the throttle valve or idling speed control valve.

The second object indicated above may be achieved according to a second aspect of this invention, which provides an apparatus for controlling an engine brake force of a motor vehicle produced by an engine of the vehicle when an accelerator pedal of the vehicle is in a released state, the vehicle having an automatic transmission which is shifted to change the speed ratio according to predetermined shifting conditions, comprising: (a) an accelerator position sensor for detecting an operating amount of the accelerator pedal; (b) a vehicle speed sensor for detecting an actual running speed of the vehicle; (c) determining means for determining whether the accelerator pedal is in the released state in which the operating amount is smaller than a predetermined threshold close to zero; (d) first control means operated in response to a determination by the determining means that the accelerator pedal is in the released state, for increasing the engine brake force with an increase in the actual running speed of the vehicle detected by the vehicle speed sensor; (e) brake detecting means for detecting that a brake pedal of the vehicle is depressed; and (f) second control means operated in place of the first control means when the brake pedal is depressed, for controlling the engine brake force such that the engine brake force controlled by the second control means is larger than that controlled by the first control means.

In the engine brake control apparatus constructed as described above according to the second aspect of the present invention, the first control means is operated to increase the engine brake force with an increase in the actual running speed of the vehicle detected by the vehicle speed sensor, when the released state of the accelerator pedal is determined by the determining means based on the output of the accelerator position sensor. When the driver releases the accelerator pedal to avoid further acceleration of the vehicle during running of the vehicle on a downhill, the engine brake force is increased by the first control means as the actual vehicle speed is increased.

When the driver further depresses the brake pedal to decelerate the vehicle, the depression is detected by the brake detecting means, and the second control means is enabled in place of the first control means, for controlling the engine brake force such that the engine brake force controlled by the second control mans while the brake pedal is depressed is larger than that controlled by the first control means while the brake pedal is released. This arrangement assures a sufficiently increased amount of the engine brake force even after the vehicle speed is lowered as a result of the depression of the brake pedal. The increased engine brake force is added to the brake force produced by the brake pedal depression, to thereby provide a sufficient total braking effect without further depression of the brake pedal. Thus, the present apparatus assures suitable deceleration of the vehicle with an increased amount of engine brake force if the driver depresses the brake pedal to further decelerate the vehicle after the accelerator pedal is released.

The third object indicated above may be achieved according to a third aspect of this invention, which provides an apparatus for controlling an engine brake force of a motor vehicle having an engine, an accelerator pedal, and an automatic transmission, the engine brake force being produced by the engine when the accelerator pedal is in a released state, the apparatus comprising: (a) an accelerator position sensor for detecting an operating amount of the accelerator pedal; (b) a vehicle speed sensor for detecting an actual running speed of the vehicle; (c) desired-speed determining means for determining whether the operating amount of the accelerator pedal detected by the accelerator position sensor is reduced below a predetermined threshold which is close to zero, and determining a desired speed of the vehicle on the basis of the actual running speed detected by the vehicle-speed sensor when the operating amount is reduced below the predetermined threshold; (d) engine brake control means for controlling the engine brake force so as to prevent the actual running speed of the vehicle detected by the vehicle speed sensor from exceeding the desired speed determined by the desired-speed determining means; and (e) updating means for updating the desired speed of the vehicle on the basis of the actual running speed, when the actual running speed becomes smaller than the desired speed by more than a predetermined value.

In the control apparatus constructed as described above according to the third aspect of this invention, the desired speed of the vehicle is determined by the desired-speed determining means, on the basis of the actual running speed of the vehicle detected by the vehicle speed sensor when the operating amount of the accelerator pedal detected by the accelerator position sensor is reduced below the predetermined threshold. The engine brake control means operates to control the engine brake force so that the actual running speed will not exceed the desired speed. When the driver releases the accelerator pedal to avoid further acceleration of the vehicle during running of the vehicle on a downhill, the desired speed of the vehicle is determined based on the actual vehicle speed at the time the accelerator pedal is released. The engine brake force is controlled so as to prevent the actual speed from exceeding the determined desired speed. Thus, the actual running speed of the vehicle is controlled by the suitably controlled engine brake force, as expected by the driver who released the accelerator pedal.

If the actual vehicle speed is lowered below the desired speed by a predetermined value or more, the desired speed of the vehicle is updated by the updating means, on the basis of the actual running speed. Accordingly, the desired speed is updated as the vehicle is decelerated as a result of the driver's depression of the brake pedal for further decelerating the vehicle after the accelerator pedal is released. When the driver releases the brake pedal after the vehicle speed is lowered to a given level, the desired speed is updated on the basis of the actual speed at the time the brake pedal is released. The engine brake control means uses the thus updated desired speed, to control the engine brake force such that the actual speed does not exceed the updated desired speed. Thus, the present arrangement prevents acceleration of the vehicle after the brake pedal is released.

As described above, the control apparatus according to the third aspect of the present invention assures suitable control of the engine brake force, as expected by the driver not only when the accelerator pedal is released, and but also when the brake pedal is then depressed and released. Thus, the apparatus permits easy control of the vehicle.

The third object may also be achieved according to a fourth aspect of the present invention, which provides an apparatus for controlling an engine brake force of a motor vehicle having an engine, an accelerator pedal, a brake pedal, and an automatic transmission, the engine brake force being produced by the engine when the accelerator pedal is in a released state, the apparatus comprising: (a) an accelerator position sensor for detecting an operating amount of the accelerator pedal; (b) a vehicle speed sensor for detecting an actual running speed of the vehicle; (c) desired-speed determining means for determining whether the operating amount of the accelerator pedal detected by the accelerator position sensor is reduced below a predetermined threshold which is close to zero, and determining a desired speed of the vehicle on the basis of the actual running speed detected by the vehicle-speed sensor when the operating amount is reduced below the predetermined threshold; (d) engine brake control means for controlling the engine brake force so as to prevent the actual running speed of the vehicle detected by the vehicle speed sensor from exceeding the desired speed determined by the desired-speed determining means; (e) brake detecting means for detecting that the brake pedal is depressed; and (f) updating means operated when the brake pedal is depressed, for updating the desired speed of the vehicle on the basis of at least the actual running speed detected by the vehicle speed sensor when the brake pedal is released.

In the control apparatus constructed as described above according to the fourth aspect of the invention, the manner of controlling the engine brake force by the engine brake control means upon releasing of the accelerator pedal during running of the vehicle on a downhill is the same as described above with respect to the third aspect of the invention. When the driver depresses the brake pedal to further decelerate the vehicle, this depression is detected by the brake detecting means, and the updating means operates to update the desired speed, on the basis of the actual speed which is detected immediately before or when the brake pedal is released. Accordingly, the desired vehicle speed used after the brake pedal is released is lowered as a result of the depression of the brake pedal, whereby the vehicle will not be accelerated after the brake pedal is released. Thus, the present apparatus have the same advantages as provided by the apparatus according to the third aspect of the invention described above.

The updating means may update the desired speed of the vehicle while the brake pedal is in the depressed state. In this case, too, the desired speed used after the brake pedal is released is obtained on the basis of the actual speed detected last during the depression of the brake pedal, that is, detected when the brake pedal is released.

BRIEF DESCRIPTION OF THE DRAWINGS

The above and other objects, features and advantages of the present invention will become more apparent by reading the following detailed description of presently preferred embodiments of the invention, when considered in conjunction with the accompanying drawings, in which:

FIG. 3 is a table indicating operating states of solenoids, clutches and brakes for establishing different gear positions of the automatic transmission of FIG. 2;

FIG. 10 is a table indicating an example of a data map used to calculate the throttle valve opening which permits the vehicle drive force equal to the vehicle running resistance;

DETAILED DESCRIPTION OF THE PREFERRED EMBODIMENTS

Figure 1:
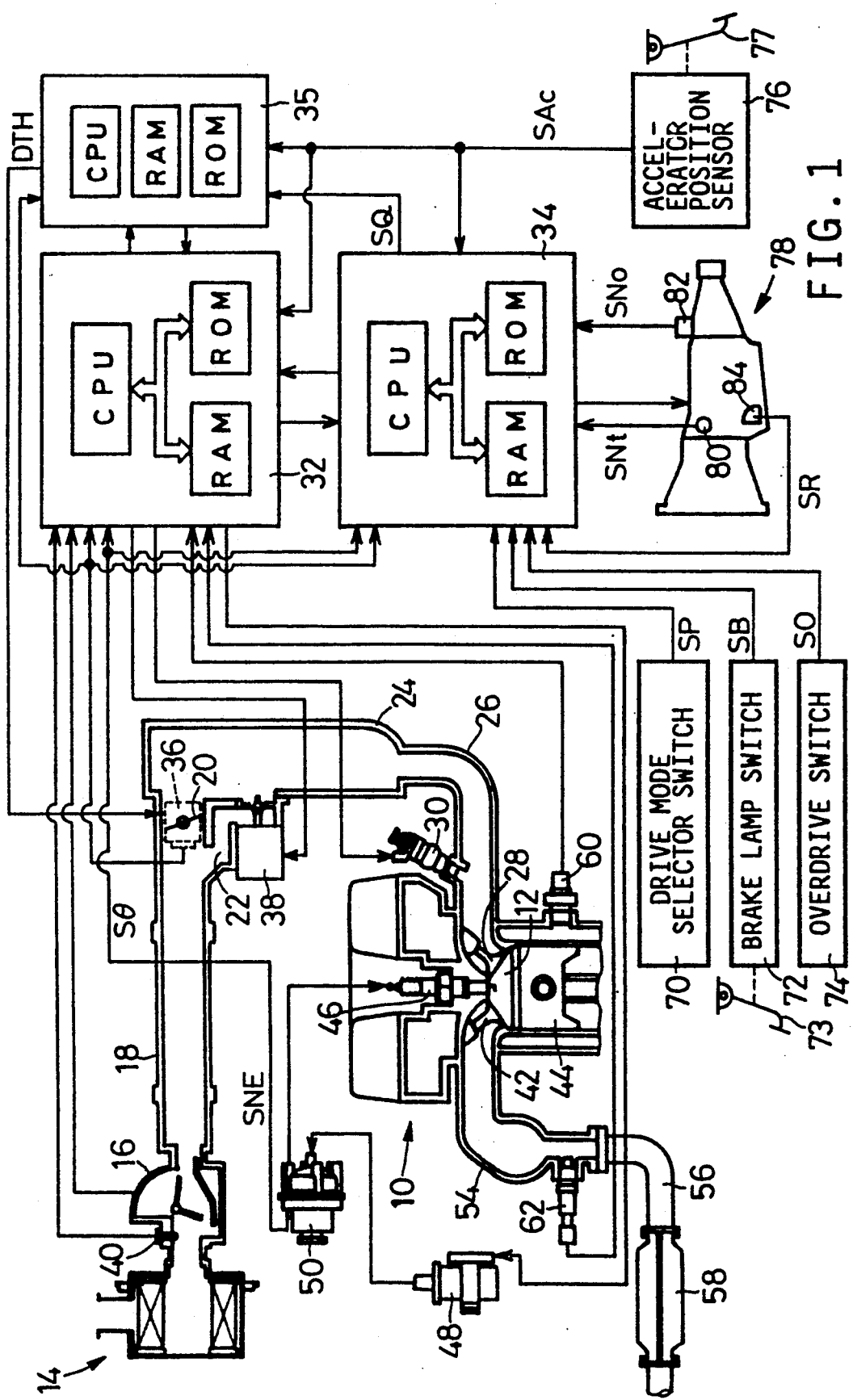
FIG. 1 is a schematic view showing an engine and an automatic transmission of a motor vehicle, and a control system therefore incorporating one embodiment of an apparatus of the present invention for controlling the engine brake force.

Referring first to FIG. 1, the vehicle employs a gasoline engine 10 having a plurality of combustion chambers, one of which is indicated at 12. Each combustion chamber 12 is supplied with a controlled volume of air, via an air cleaner 14, air flow meter 16, an intake passage 18, a throttle valve 20, a by-pass passage 22, a surge tank 24, an intake manifold 26 and an intake valve 28. Within the intake manifold 26, the air is mixed with a fuel injected by a fuel injector valve 30 attached to the manifold 26, whereby an air-fuel mixture is introduced into the combustion chamber 12.

The air flow meter 16 is adapted to measure the quantity of the intake air (hereinafter referred to as "intake air quantity") introduced into the intake passage 18, and applies to an engine control computer 32 a signal indicative of the intake air quantity. The throttle valve 20 serves to continuously change the air quantity to be supplied to the engine 10. The amount of opening $\theta$ of the throttle valve 20 is controlled according to a THROTTLE CONTROL signal DTH received from a throttle control computer 35. The throttle valve 20 is provided with a throttle position sensor 36 which generates a THROTTLE OPENING signal $S\theta$ indicative of the throttle valve opening $\theta$. This signal $S\theta$ is applied to the engine control computer 32, a transmission control computer 34 and the throttle control computer 35.

The by-pass passage 22 is formed in parallel with the throttle valve 20, and is provided with an idling speed control valve 38 whose opening is controlled by the engine control computer 32, to regulate the air quantity that by-passes the throttle valve 20, so that the idling speed of the engine 10 is controlled. The fuel injector valve 30 is also controlled by the engine control computer 32, so as to regulate the timing and amount of the fuel injection into the intake manifold 26. Upstream of the air flow meter 16, there is provided an intake air temperature sensor 40 which applies to the engine control computer 32 a signal indicative of the temperature of the intake air.

Figure 2:
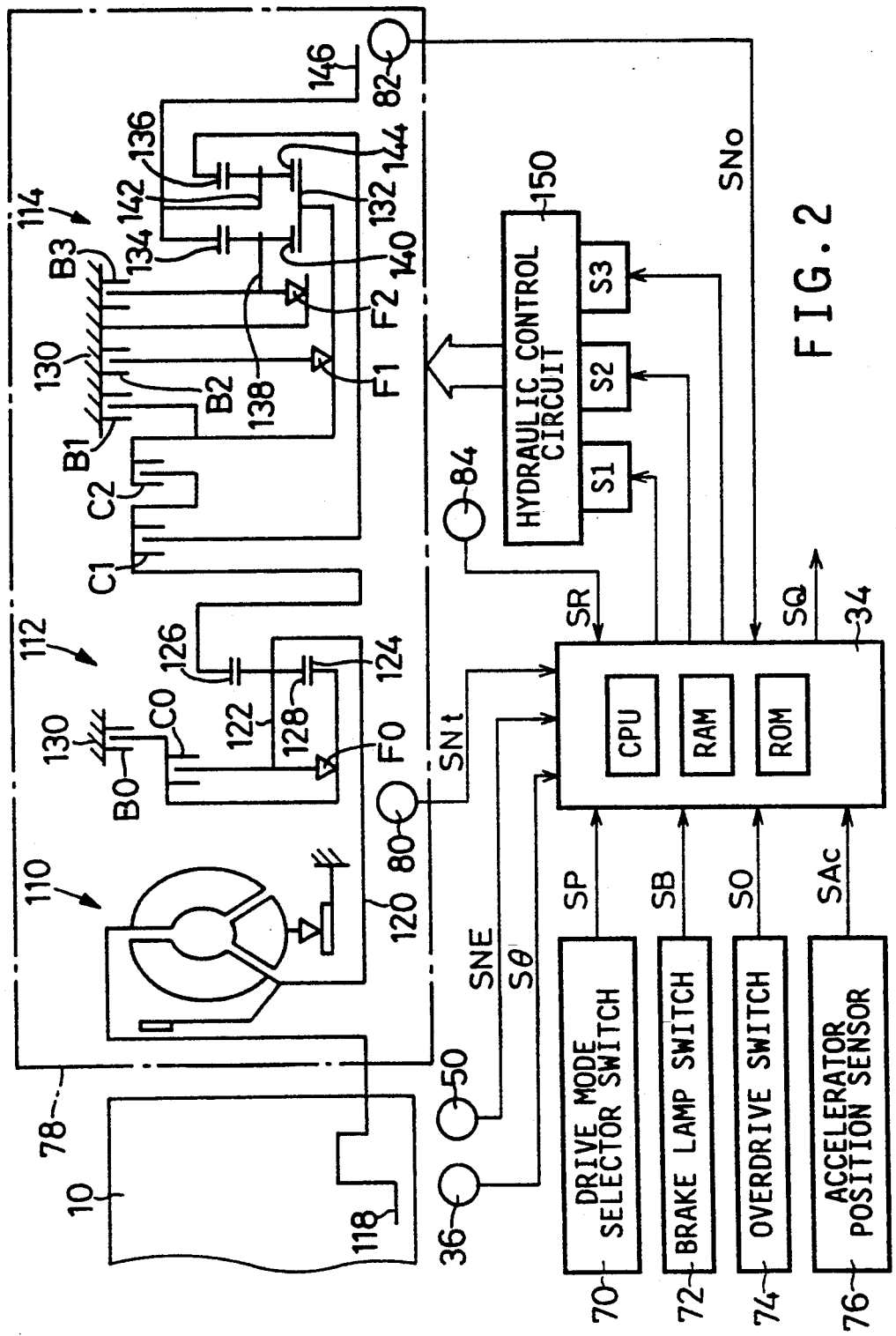
FIG. 2 is a view of the automatic transmission, a transmission control computer, and other components for controlling the transmission.

For each combustion chamber 12 of the engine 10, there are provided the intake valve 28, an exhaust valve 42, a piston 44 and a spark plug 46. The spark plug 46 is energized by a high voltage supplied through a distributor 50 from an igniter 48 under the control of the engine control computer 32, so that the air-fuel mixture within the combustion chamber 12 is ignited for explosion, to reciprocate the piston 44 and thereby rotate a crankshaft 118 (FIG. 2).

The intake and exhaust valves 28, 42 are opened and closed by a camshaft rotated in synchronization with the crankshaft 118. To adjust the opening and closing timing of these valves 28, 42, the angular phase of the camshaft relative to that of the crankshaft 118 is regulated by a valve timing mechanism (not shown), as well known in the art. This mechanism is controlled by the engine control computer 32. The exhaust gas produced as a result of combustion of the fuel-fuel mixture is discharged from the combustion chamber 12 into the atmosphere, through the exhaust valve 42, an exhaust manifold 54, an exhaust passage 56 and a catalytic converter 58.

The engine 10 is equipped with a coolant temperature sensor 60 for detecting the temperature of the coolant water. The sensor 60 applies to the computer 32 a signal indicative of the coolant water temperature. To the exhaust manifold 54, there is attached an oxygen sensor 62 for detecting the oxygen concentration of the exhaust gas to thereby determine the air/fuel ratio of the air-fuel mixture. A signal indicative of the oxygen concentration is fed from the sensor 62 to the engine control computer 32. The distributor 50 has a speed sensor which produces pulses in synchronization with the rotation of the crankshaft 118. Namely, the speed sensor produces an ENGINE SPEED signal SNE in the form of pulses indicative of a rotating speed NE of the engine 10. This pulse signal SNE is fed to the engine control computer 32 and the transmission control computer 34.

Each of the engine control computer 32, transmission control computer 34 and throttle control computer 35 incorporates a central processing unit CPU, a random-access memory RAM, a read-only memory ROM, input and output interface circuits and A/D converters, and operates to effect signal processing operations according to control programs stored in the ROM while utilizing a temporary data storage function of the RAM. The transmission control computer 34 receives the following signals as well as the signals identified above: a DRIVE MODE signal SP indicative of a selected drive mode of the vehicle, received from a DRIVE MODE selector switch 70; a BRAKE signal SB indicative of an operation of a brake pedal 73, received from a BRAKE LAMP switch 72; an OVERDRIVE signal SO received from an OVERDRIVE switch 74, which permits an automatic transmission 78 to be placed in an OVERDRIVE position O/D, as described below; and an ACCELERATOR POSITION signal SAc indicative of the operating amount Ac of an accelerator pedal 77 of the vehicle, received from an ACCELERATOR POSITION sensor 76. The ACCELERATOR POSITION signal SAc is also applied to the engine control computer 32 and the throttle control computer 35.

The DRIVE MODE selector switch 70 is provided to select a desired one of drive modes of the vehicle, which includes an AUTOMATIC ENGINE BRAKING mode and other modes such as a POWER DRIVE mode and an ECONOMY DRIVE mode. In the AUTOMATIC ENGINE BRAKING mode, the amount of the engine braking effect (braking effect provided by the engine 10) is automatically increased when the vehicle runs on a downhill. In the POWER DRIVE mode, the transmission control computer 34 controls the shifting of the automatic transmission 78 according to shift-up and shift-down pattern maps that permit the vehicle to run with high power and drivability. In the ECONOMY DRIVE mode, the computer 34 select shift-up and shift-down pattern maps that permit relatively high fuel economy of the vehicle. The BRAKE LAMP switch 72 is disposed near the brake pedal 73, and may be an on-off switch which is turned on when the brake pedal 73 is depressed.

Referring next to FIG. 2, the automatic transmission 78 includes a torque converter 110, a first planetary gear assembly 112, and a second planetary gear assembly 114. The torque converter 110 has a pump impeller connected to the crankshaft 118 of the engine 10, and a turbine impeller connected through an input shaft 120 to a carrier 122 of the first planetary gear assembly 112. The first planetary gear assembly 112 includes a planetary gear set consisting of a sun gear 124, a ring gear 126, a carrier 122, and a planetary gear 128 which is rotatably supported by the carrier 122 and which meshes with the sun gear 124 and the ring gear 126. Between the sun gear 124 and the carrier 122, there are provided a clutch $C_0$ and a one-way clutch $F_0$ in parallel connection with each other. Further, a brake $B_0$ is provided between the sun gear 124 and a housing 130 of the transmission 78.

The second planetary gear assembly 114 includes a composite planetary gear device consisting of: a sun gear 132; a pair of ring gears 134, 136; a carrier 138; a planetary gear 140 which is rotatably supported by the carrier 138 and which meshes with the sun gear 132 and ring gear 134; a carrier 142; and a planetary gear 144 which is rotatably supported by the carrier 142 and which meshes with the sun gear 132 and ring gear 136. A clutch $C_1$ is provided between the ring gear 136 and the ring gear 126 of the first planetary gear assembly 112, and a clutch $C_2$ is provided between the sun and ring gears 132, 126. A brake $B_1$, a one-way clutch $F_1$ and a brake $B_2$ are provided in series connection with each other between the sun gear 132 and the housing 130. The clutch $F_1$ and brake $B_2$ are connected in parallel with the brake $B_1$. Between the carrier 138 and the housing 130, there are provided a brake $B_3$ and a one-way clutch $F_2$ in parallel connection with each other. The ring gear 134 and the carrier 142 are integrally fixed to an output shaft 146 of the transmission 78, and the output shaft 146 is connected to drive wheels of the vehicle through a differential gear device and other components.

The clutches $C_0$–$C_2$ and brakes $B_0$–$B_3$ (hereinafter referred to generally as clutches C and brakes B, where appropriate) are frictional coupling devices in the form of multiple-disk clutches or band brakes, which are operated by respective hydraulic actuators driven by a pressurized working fluid supplied from a hydraulic control circuit 150. This hydraulic control circuit 150 has a number of switch valves which are operated by respective combinations of energized and de-energized states of three solenoids S1, S2 and S3, according to signals from the transmission control computer 34, so that the clutches C and brakes B are selectively engaged to place the automatic transmission 78 in one of four forward-drive gear positions "1st", "2nd", "3rd" and "O/D", as indicated in the table of FIG. 3. In the table, "o" indicates the energized state of the solenoid S1, S2 and S3, and the engaged state of the clutches C and brakes B. A shift lever is provided near the driver's seat on the vehicle, and has three operating positions "D" (DRIVE), "S" (SECOND) and "L" (LOW). When the shift lever is placed in a DRIVE position "D", all of the four gear positions are available (when the OVERDRIVE switch 74 is ON). In the SECOND position "S", the three gear positions "1st", "2nd" and "3rd" are available. In the LOW position "L", only the two gear positions "1st" and "2nd" are available. The speed ratio (speed Nt of the input shaft 120/speed No of the output shaft 146) of the transmission 78 is the highest when the transmission 78 is placed in the first-gear position "1st". The speed ratio decreases as the transmission is shifted up toward the overdrive position "O/D". The 3rd-gear position "3rd" is a direct drive position in which the speed ratio is 1.0.

With the shift lever placed in the DRIVE position "D", an engine brake is applied to the vehicle when the transmission 78 is placed in the 3rd-gear or overdrive position "3rd" or "O/D", but is not applied in the 1st-gear and 2nd-gear position "1st" or "2nd", due to the actions of the one-way clutches $F_1$, $F_2$ with the solenoid 3 in the de-energized state. In the energized state of the solenoid S3, however, the brakes $B_3$ and $B_1$ are engaged to permit the engine braking even when the transmission 78 is placed in the 1st-gear and 2nd-gear positions "1st" and "2nd", as indicated in the rows corresponding to the 1st-gear and 2nd-gear positions in parentheses in the table of FIG. 3. An engine brake is also effective in the 2nd-speed position "2nd" with the shift lever in the SECOND position "S", and in the 1st-gear and 2nd-gear positions "1st" and "2nd" with the shift lever in the LOW position "L". Although the table of FIG. 3 does not indicate a REVERSE position "R" of the shift lever, the transmission 78 has a reverse-gear position, which is established by an operation of a manual shift valve in the hydraulic control circuit 150 when the shift lever is shifted to the REVERSE position.

The automatic transmission 78 is provided with two speed sensors 80, 82 for detecting the rotating speed Nt of the input shaft 120 (speed of the turbine impeller) and the rotating speed No of the output shaft 146, respectively. The speed sensors 80, 82 generate an INPUT SPEED signal SNt and an OUTPUT SPEED signal SNo, respectively, which are applied to the transmission control computer 34. The hydraulic control circuit 150 is provided with a NEUTRAL START switch 84 adapted to detect the DRIVE SECOND, LOW and REVERSE positions "D", "S", "L" and "R" of the shift lever, by sensing the position of the manual shift valve of the circuit 150, which position varies with an operation of the shift lever. The NEUTRAL START switch 84 applies to the computer 34 a SHIFT POSITION signal SR indicative of the position of the shift lever.

The computers 32, 34, 35 are interconnected to exchange various signals necessary for controlling the engine 10, throttle valve 20 and transmission 78. To this end, at least one of the three computer 32, 34, 35 should receive the THROTTLE OPENING signal Sθ, ENGINE SPEED signal SNE and ACCELERATOR POSITION signal SAc. The engine 10, throttle valve 20 and transmission 78 may be controlled further according to signals representative of the other operating parameters of the vehicle such as the angular position of the steering wheel, gradient of the road surface, and temperature of the exhaust gas.

For instance, the engine control computer 32 controls the fuel injector valve 30, ignitor 48, idling speed control valve 38, valve timing changing mechanism, etc., to suitably regulate the amount and timing of the fuel injection, ignition timing of the air-fuel mixture in the combustion chamber 12, idling speed of the engine 10 and opening and closing timing of the intake and exhaust valves 28, 42, according to data maps and algorithms, depending upon the intake air quantity amount of opening θ of the throttle valve 20, engine speed NE, engine coolant temperature, intake air temperature, oxygen concentration in the exhaust passage 56, and operating amount Ac of the accelerator pedal 77 (ACCELERATOR POSITION signal SAc). The above data maps and algorithms are formulated to minimize the fuel consumption and reduce the amount of harmful exhaust emissions of the engine 10, while assuring sufficient output of the engine 10, for example. The transmission control computer 34 energizes and de-energizes the solenoids S1, S2 and S3, to control the shifting of the automatic transmission 78, according to the throttle opening angle θ, engine speed NE, DRIVE MODE signal SP, BRAKE signal SB, OVERDRIVE signal SO, ACCELERATOR POSITION signal SAc and OUTPUT SPEED signal SNo, for example. The computer 34 also controls the duty cycle of a solenoid provided in the hydraulic control circuit 150 for controlling the lock-up clutch of the torque converter 110, more precisely, for selectively placing the lock-up clutch in the fully engaged state, partially engaged (slipping) state or fully released state. The computer 34 further functions to apply a THROTTLE COMMAND signal SQ to the throttle control computer 35, so as to regulate the amount of opening θ of the throttle valve 20 depending on the ACCELERATOR POSITION signal SAc, and to adjust the throttle opening angle θ for regulating the amount of the engine brake to be applied to the vehicle when the operating amount Ac of the accelerator pedal 77 is zero. The throttle control computer 35 applies the THROTTLE CONTROL signal DTH to the throttle valve 20, to control the throttle opening θ primarily according to the THROTTLE COMMAND signal SQ.

Figure 5:
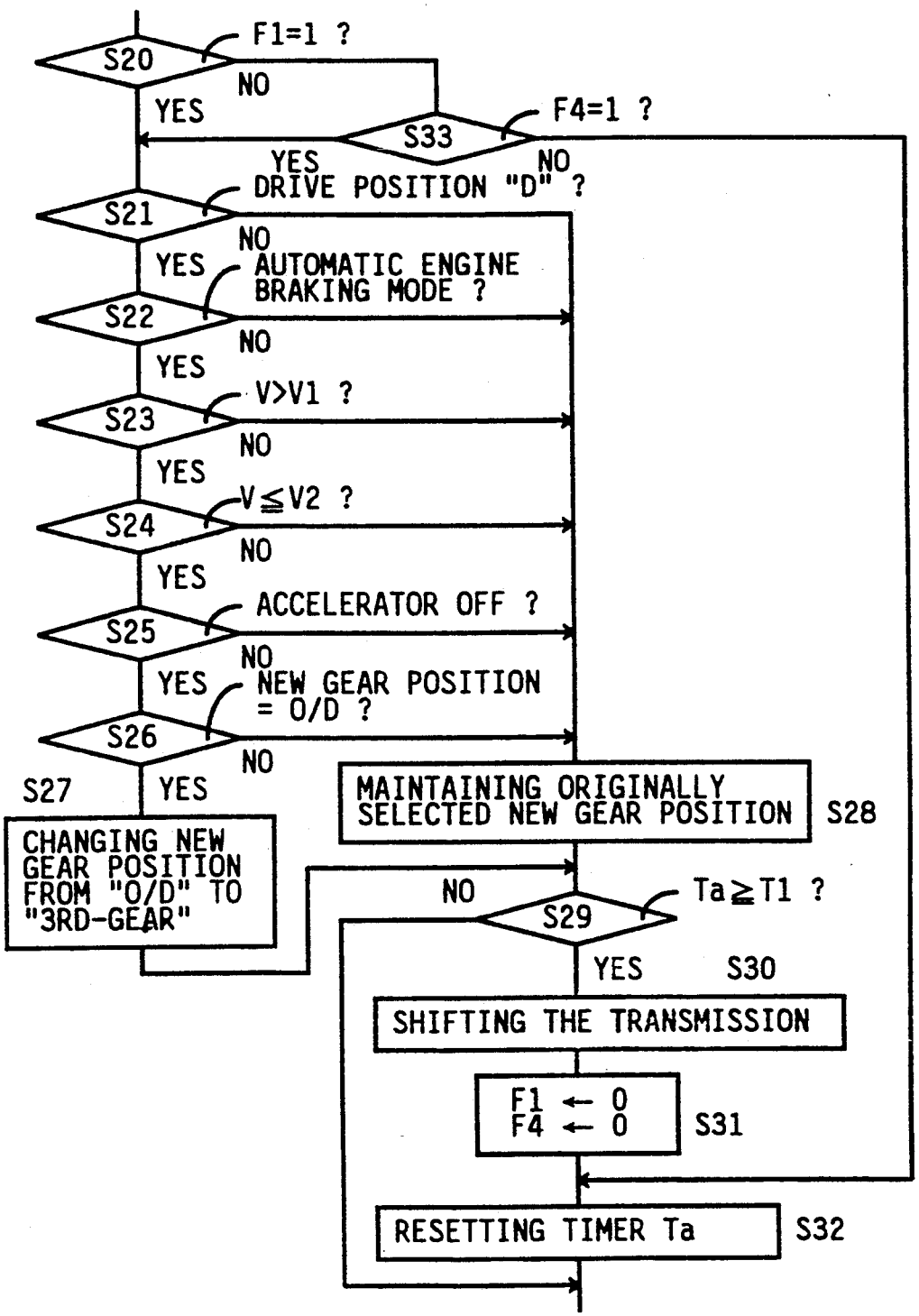
FIG. 5 is a flow chart illustrating an operation to shift the automatic transmission.
Figure 6:
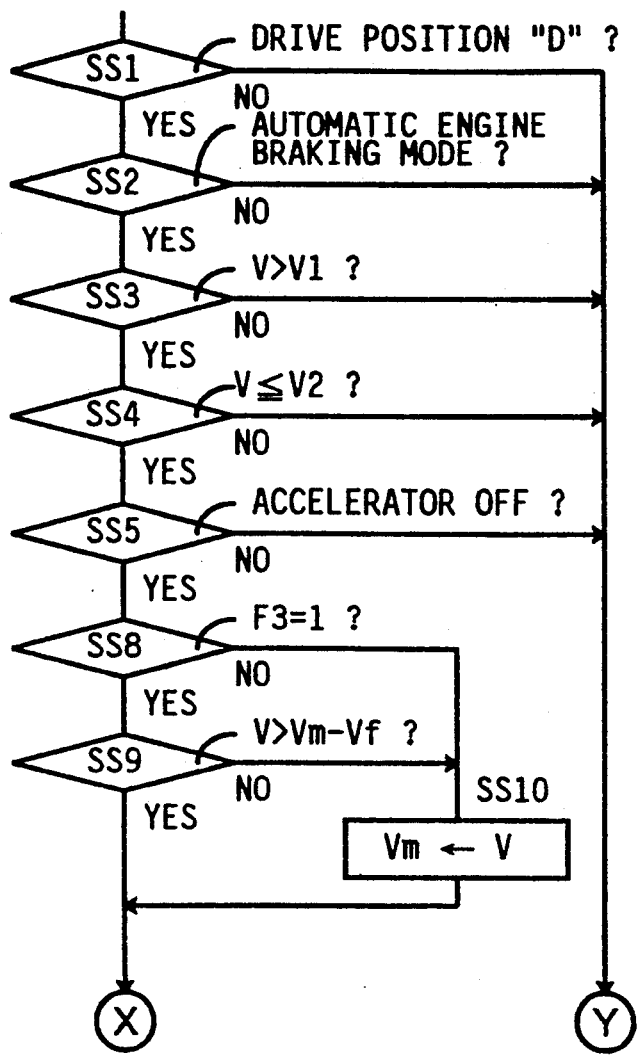
FIGS. 6 and 7 are flow charts illustrating an operation to control the throttle valve of the engine.
Figure 7:
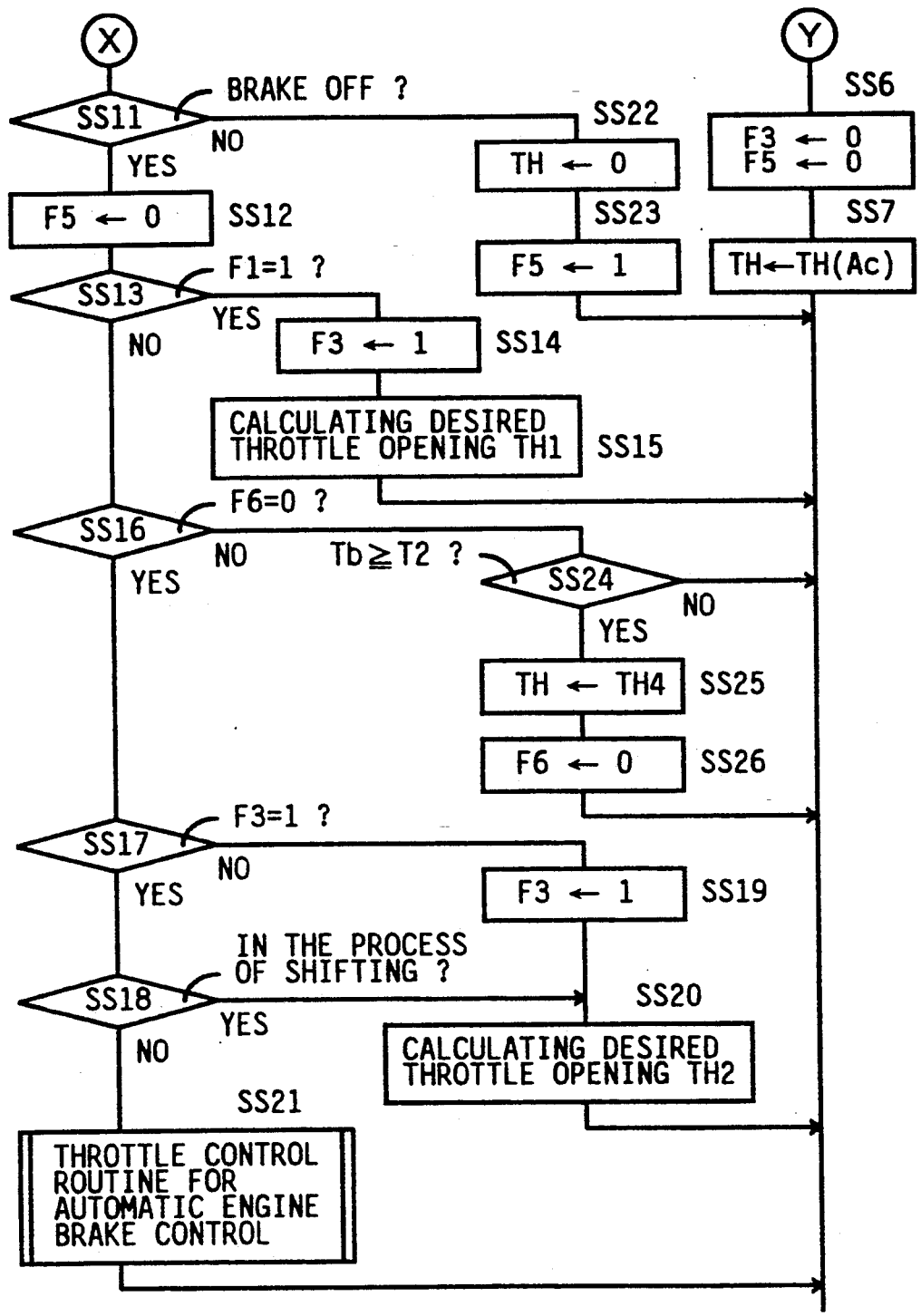
Figure 8:
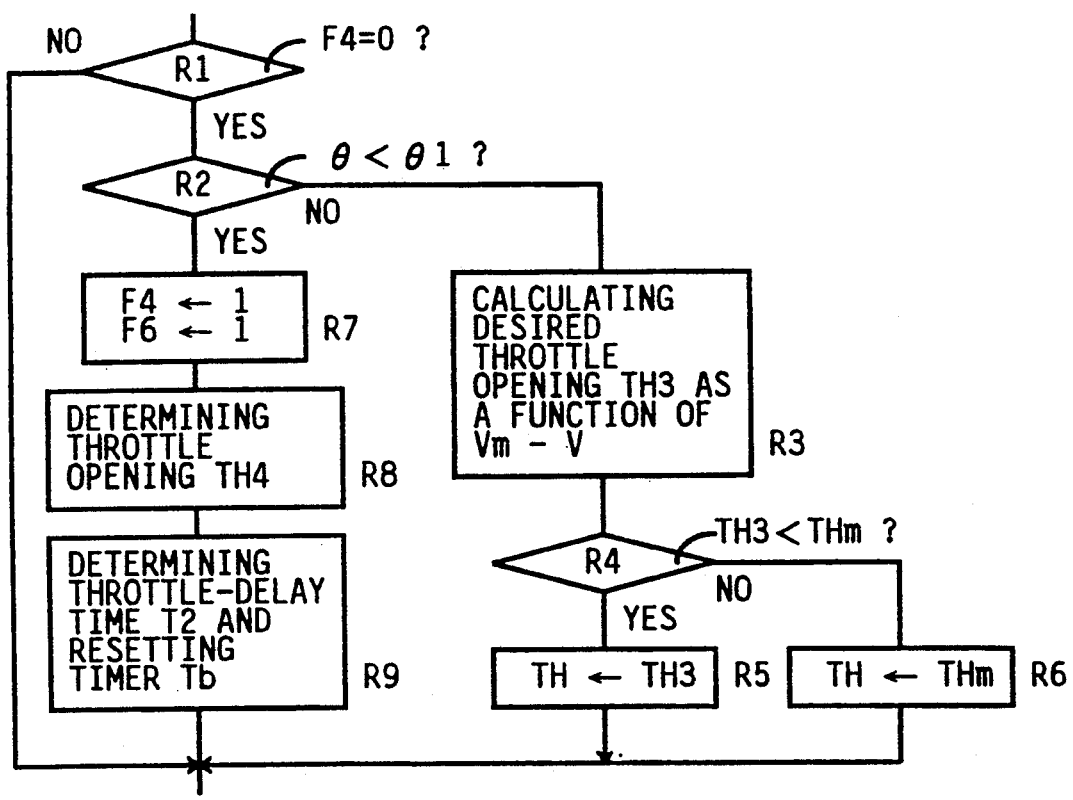
FIG. 8 is a flow chart illustrating a throttle control routine in step SS21 of FIG. 7.

Referring further to the flow charts of FIGS. 4 through 8, there will be described in detail the operations of the transmission control computer 34 to control the shifting of the transmission 78 and determine the level of the THROTTLE COMMAND signal SQ. The flow charts of FIGS. 4 and 5 illustrate a shift control routine for shifting the automatic transmission 78, while the flow charts of FIGS. 6–8 illustrate a throttle control routine to determine the THROTTLE COMMAND signal SQ. The following description refers to the operations when the shift lever is placed in the DRIVE position "D" in which the transmission 78 may be placed in any one of the four forward-drive positions as described above. The shift control routine and the throttle control routine are executed repeatedly with a cycle time of 8–32 msecs.

Figure 4A:
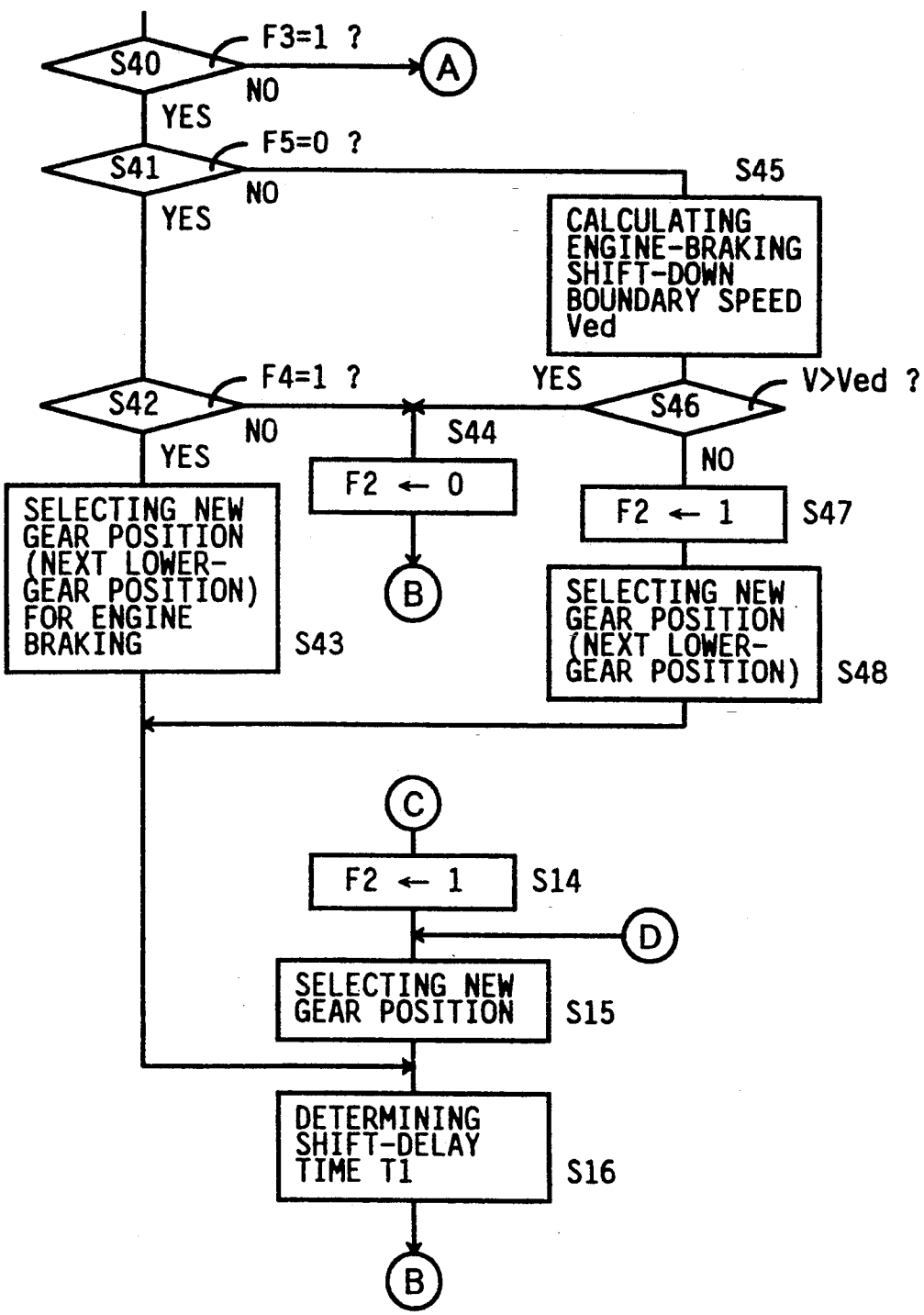
FIGS. 4A and 4B are flow charts illustrating an operation to determine whether the automatic transmission should be shifted or not.
Figure 4B:
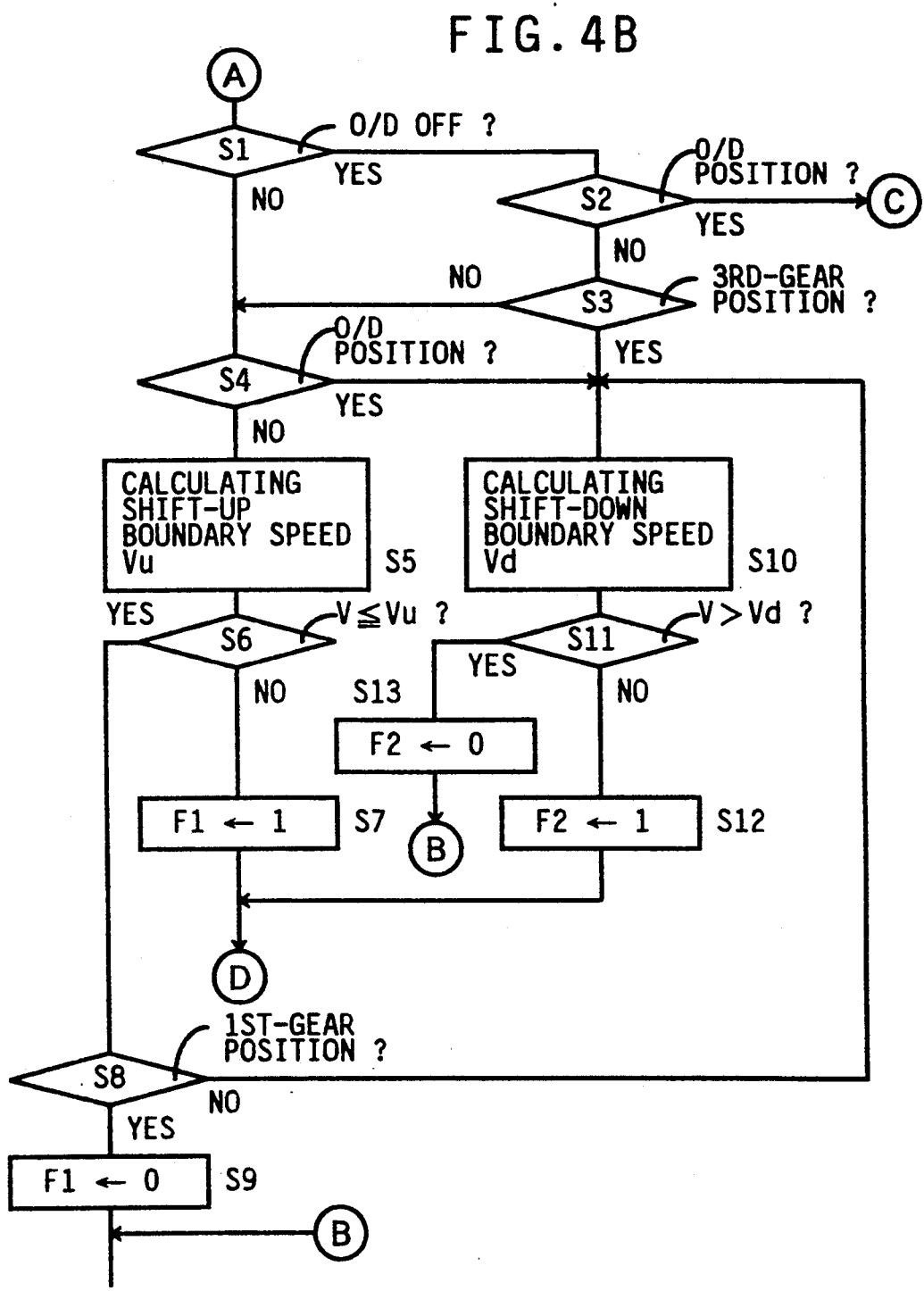

Step S1 and the following steps in FIGS. 4A and 4B are for determining whether or not the transmission 78 is shifted up or down from the current position, and these steps are executed when a negative decision (NO) is obtained in step S40, namely, when a flag F3 is not set at "1". The flag F3 is set to "1" in step SS14 or SS19 of FIG. 7 when the conditions of steps SS1 through SS5 of FIG. 6 are all satisfied to effect automatic engine brake control and is reset to "0" in step SS6 when any one of the conditions of steps SS1–SS5 is not satisfied. Thus, the steps S1 and the subsequent are implemented to control the transmission 78 during a normal running of the vehicle without an engine brake applied thereto.

More specifically, step S1 is implemented to determine, on the basis of the OVERDRIVE signal SO, whether or not the overdrive position "O/D" is currently available. If the signal SO indicates that the overdrive position "O/D" is not available, namely, the transmission 78 is inhibited from being shifted to or placed in the overdrive position "O/D", the control flow goes to step S2 to determine whether or not the transmission 78 is currently placed in the overdrive position "O/D". The current position of the transmission 78 is determined on the basis of the levels of the signals applied to the solenoids S1, S2 and S3. If the transmission 78 is currently placed in the overdrive position "O/D", this means that the OVERDRIVE switch 74 has been turned to the OFF position with the transmission 78 placed in the overdrive position "O/D". In this case, a flag F2 is set to "1" in step S14, and the 3rd-gear position "3rd" is selected in step S15, as the next or new gear position of the transmission 78. If an affirmative decision (YES) is obtained in step S1 but a negative decision (NO) is obtained in step S2, step S3 is implemented to determine whether the transmission 78 is currently placed in the 3rd-gear position "3rd" or not. If a negative decision (NO) is obtained in step S3, or if a negative decision (NO) is obtained in step S1 (the overdrive position "O/D" is available), step S4 is implemented to determine whether the currently selected gear position is the overdrive position "O/D" or not. If a negative decision (NO) is obtained in step S4, step S5 and the following steps are implemented to determine whether the transmission 78 should be shifted up or not.

Figure 9:
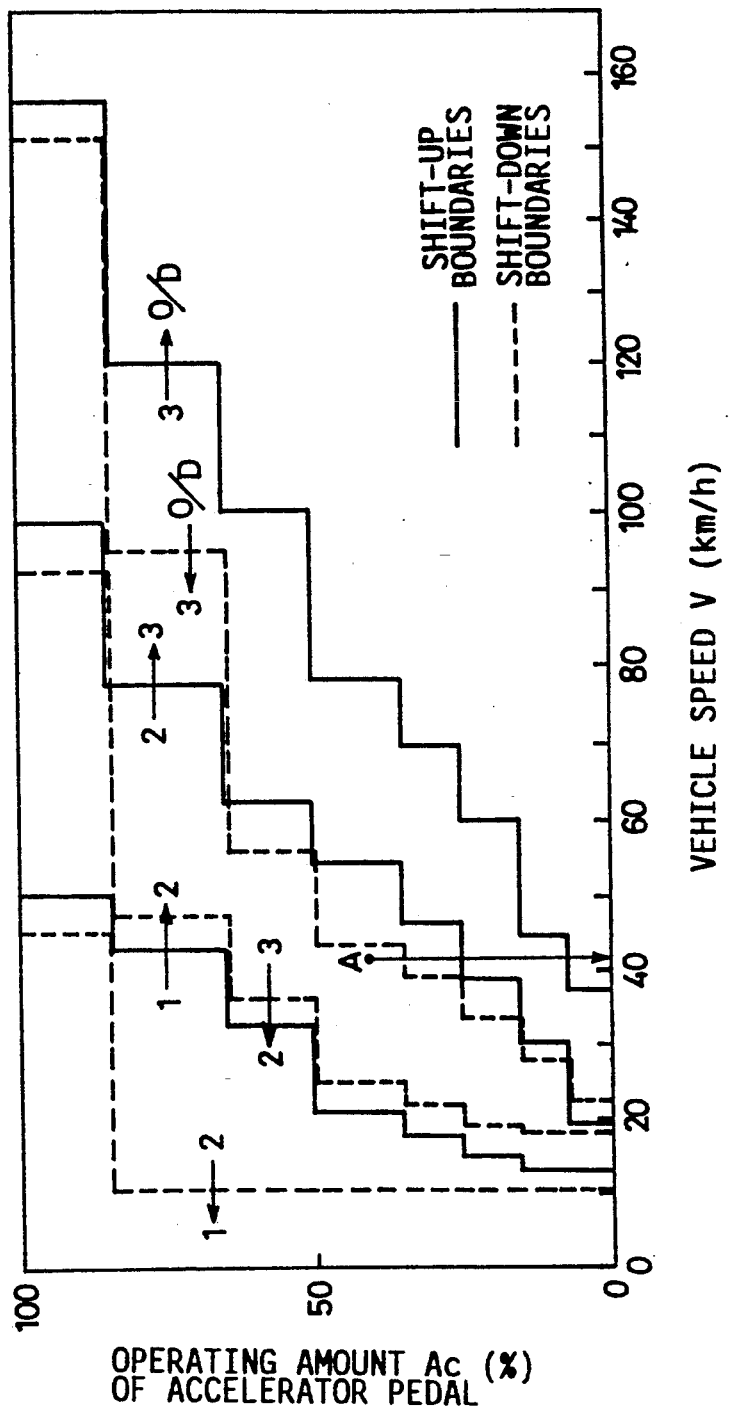
FIG. 9 is a diagram showing an example of a shift pattern map used to determine whether the transmission should be shifted or not.

In step S5, a shift-up boundary speed Vu of the vehicle is calculated according to the shift-up pattern map stored in the ROM of the computer 34, as indicated by solid lines in FIG. 9. The shift-up pattern map consists of three shift-up boundaries corresponding to the current positions of the transmission 78 from which the transmission 78 is shifted up. Each of the shift-up boundaries represents a relationship between the accelerator pedal position Ac and the vehicle speed V. These shift-up boundary patterns are formulated so that the transmission 78 is more likely to be shifted up as the operating amount Ac of the accelerator pedal 77 decreases and as the vehicle speed V increases. Namely, the transmission 78 is shifted up at a relatively low vehicle speed V even when the operating amount Ac of the accelerator pedal 77 is relatively small, and at a relatively high speed V when the operating amount Ac is relatively large. According to these shift-up boundary patterns and on the basis of the detected operating amount Ac, the shift-up boundary speeds Vu are calculated in step S5. Step S5 is followed by step S6 to compare the calculated shift-up boundary speed Vu corresponding to the current gear position of the transmission 78, with the actual vehicle speed V which is calculated from the output shaft speed No of the transmission 78 as represented by the OUTPUT SPEED signal SNo. This comparison is made to determine whether the transmission 78 should be shifted up or not. More particularly, if the calculated vehicle speed is equal to or lower than the shift-up boundary speed Vu, it is not necessary to shift up the transmission 78. In this case, step S8 is implemented to determine whether the transmission 78 is currently placed in the 1st-gear position "1st" or not. If an affirmative decision (YES) is obtained in step S8, step S9 is implemented to reset a flag F1 to "0", and one cycle of the shift control routine is completed. The flag F1 when set at "1" indicates the necessity of the shifting up the transmission 78. If the actual vehicle speed V is higher than the shift-up boundary speed Vu, step S7 is implemented to set the flag F1 to "1", and the control flow goes to step S15 to select the next higher-gear position as the new gear position of the transmission 78. If the current position is the 2nd-gear position "2nd", for example, the 3rd-gear position "3rd" is selected as the new gear position. In this case, however, if the actual vehicle speed V exceeds the boundary speed Vu for the shifting from "3rd" to "O/D" (due to a rapid decrease in the operating amount Ac of the accelerator pedal 77, for example) after the 3rd-gear position "3rd" has been once selected in step S15 and before the transmission 78 is actually shifted up to the position "3rd", the gear position "O/D" is newly selected in step S15. To this end, the shift-up boundary speeds Vu corresponding to all the gear positions of the transmission 78 are calculated in step S5 based on the current operating amount Ac of the accelerator pedal 77, and the actual vehicle speed V is compared in step S6 with the calculated shift-up boundary speeds Vu to determine the necessity of shifting up the transmission 78.

If an affirmative decision (YES) is obtained in step S3 or in step S4, or if a negative decision (NO) is obtained in step S$\theta$, the control flow goes to step S10 and the following steps to determine whether the transmission 78 should be shifted down or not. In step S10, the shift-down boundary speeds Vd corresponding to the gear-positions of the transmission 78 are calculated according to the shift-down pattern map indicated by broken lines in FIG. 9, and on the basis of the calculated actual vehicle speed V. The shift-down pattern map is formulated so that the transmission 78 is more likely to be shifted down as the operating amount Ac of the accelerator pedal 77 increases and as the vehicle speed V decreases. Step S10 is followed by step S11 to determine whether the actual vehicle speed V is higher than the shift-down boundary speed Vd or not. If the actual vehicle speed V is higher than the shift-down boundary speed Vd, it is not necessary to shift down the transmission 78, and step S13 is implemented to reset a flag F2 to "0". One cycle of execution of the shift control routine is ended with step S13. The flag F2 when set at "1" indicates the necessity of shifting down the transmission 78. If the vehicle speed V is equal to or lower than the shift-down boundary speed Vd, step S12 is implemented to set the flag F2 to "1", and the control flow goes to step S15 to select the next lower-gear position as the new gear position of the transmission 78. If the current position is the overdrive position "O/D", for example, the 3rd-gear position "3rd" is selected as the new gear position. In this case, however, if the actual vehicle speed V becomes equal to or lower than the boundary speed Vd for the shifting from "3rd" to "2nd" (due to a rapid increase in the operating amount Ac of the accelerator pedal 77, for example) after the 3rd-gear position "3rd" has been once selected in step S15 and before the transmission 78 is actually shifted down to the position "3rd", the gear position "2nd" is newly selected in step S15. To this end, the shift-down boundary speeds Vd corresponding to all the gear positions of the transmission 78 are calculated in step S10 based on the current operating amount Ac of the accelerator pedal 77, and the actual vehicle speed V is compared in step S11 with the calculated shift-down boundary speeds Vd to determine the necessity of shifting up the transmission 78.

If an affirmative decision (YES) is obtained in step S40, that is, if the automatic engine brake control is in effect, step S40 is followed by step S41 to determine whether a flag F5 is set at "0" or not. The flag F5 is set to "1" in step SS23 of FIG. 7 if the conditions of steps SS1-SS5 of FIG. 6 are all satisfied to effect the automatic engine brake control and if the brake pedal 73 is depressed. If not, the flag F5 is reset to "0" in step SS6 or SS12, and step S42 is implemented. If the flag F5 is set at "1" with the brake pedal 73 depressed, the control flow goes to step S45 in which a shift-down boundary speed Ved of the vehicle used during engine braking of the vehicle is calculated on the basis of the detected operating amount Ac of the accelerator pedal 77, and according to an engine-braking shift-down pattern map also stored in the ROM of the transmission control computer 34. Like the ordinary shift-down pattern map as indicated by the broken lines in FIG. 9, this engine-braking shift-down pattern map consists of four engine-braking shift-down boundaries corresponding to the four gear positions of the transmission 78, which represent relationships between the operating amount Ac and the vehicle speed V. The engine-braking shift-down boundaries are formulated to easier shift-down actions of the transmission 78, with the boundary lines being shifted to the right as seen in FIG. 9, namely, to the side of the higher vehicle speed V, so that the actual vehicle speed V is likely to be lower than the engine-braking shift-boundary speeds Ved. Step S45 is followed by step S46 to determine whether the actual vehicle speed V is higher than the calculated engine-braking shift-down boundary speed Ved. If the actual vehicle speed V is higher than the engine-braking shift-down boundary speed Ved, it is not necessary to shift down the transmission 78, and step S44 is implemented to reset the flag F2 to "0", whereby one cycle of the shift control routine is completed. If the vehicle speed V is equal to or lower than the shift-down boundary speed Ved, step S47 is implemented to set the flag F2 to "1", and step S48 is then implemented to select the next lower-gear position as the new gear position of the transmission 78. If the 2nd-gear or 1st-gear position "2nd" or "1st" is selected as the new gear position to which the transmission 78 is shifted down, the engine brake is applied to the vehicle. Namely, the gear positions "1st" and "2nd" are established with the brakes $B_3$ and $B_1$ placed in the engaged state by energization of the solenoid S3, as indicated in the rows of the table of FIG. 3 corresponding to the (1st) and (2nd). In this respect, it is noted that the 2nd-gear position "2nd" is selected as the new gear position, even when the 3rd-gear position "3rd" is once selected as the new gear position, if the actual vehicle speed V is suddenly lowered and becomes lower than the engine-braking shift-down boundary speed Ved for the shifting of the transmission 78 from the 3rd-gear position "3rd" to the 2nd-gear position "2nd", before the transmission 78 is shifted down to the first selected 3rd-gear position "3rd". In this connection, steps S45 and S46 are executed for all the engine-braking shift-down boundaries corresponding to the respective gear positions of the transmission 78, in order to determine the necessity of shifting down the transmission 78 so as to effectively apply an engine brake to the vehicle.

When the brake pedal 73 is not depressed, step S42 is implemented as indicated above, to determine whether a flag F4 is set at "1" or not. The flag F4 is set to "1" in step R7 of FIG. 8, for shifting shift down the transmission 78 so as to increase the engine brake force during the automatic engine brake control. The flag F4 is reset to "0" in step S31 of FIG. 5 when the shift-down of the transmission 78 is completed. If the flag F4 is set at "0", step S44 is implemented to reset the flag F2 to "0", whereby one cycle of the shift control routine is terminated. If the flag F4 is set at "1", step S43 is implemented to select the next lower-gear position as the new gear position of the transmission 78, so as to effect the engine braking. That is, the new gear position is the 2nd-gear or 1st-gear position "2nd" or "1st", these positions are established with the solenoid S3 being energized, as indicated at (1st) and (2nd) in the table of FIG. 3.

Steps S15, S43 and S48 in which the new gear position of the transmission 78 is selected is followed by step S16 to determine a shift-delay time T1 provided before the transmission 78 is actually shifted to the selected new gear position. The shift-delay time T1 is provided to inhibit successive shifting actions of the transmission 78 within a short time, and avoid the shifting of the transmission 78 to the overdrive position "O/D" even when the accelerator pedal 77 is rapidly released to the non-operated position before the shifting to the overdrive position "O/D", to effect an engine brake during running of the vehicle on a downhill. The shift-delay time T1 may be a constant value for all shifting operations, or may change depending upon whether the shifting to be performed is a shift-up or a shift-down action, and/or whether the shift-down action in question is effected in the AUTOMATIC ENGINE BRAKING mode or not. The shift-delay time T1 may also be determined according to the operating amount Ac of the accelerator pedal 77, vehicle speed V and the currently selected gear position of the transmission 78 at the time a shifting action of the transmission 78 is determined.

Reference is now made to the flow chart of FIG. 5, there will be described the manner in which the transmission 78 is shifted up or down to the new gear position selected in step S15 or S43 as described above. Step S20 is implemented to determine whether the flag F1 is set at "1" or not, namely, whether the next higher-gear position has been selected in step S15, or not. If the flag F1 is set at "1", step S21 and the following steps are implemented. If the flag F1 is not set at "1", the control flow goes to step S33 to determine whether the flag F4 is set at "1" or not, namely, whether or not the next lower-gear position has been selected as the new gear position in step S43 to increase the engine brake force. If the flag F4 is set at "1", the control flow goes to step S21 and the following steps. If the flag F4 is set at "0", step S32 is immediately implemented to reset a timer Ta, whereby one cycle of the routine is completed.

Step S21 is provided to determine, on the basis of the SHIFT POSITION signal SR, whether the shift lever is placed in the DRIVE position "D" or not. Step S22 determines, on the basis of the DRIVE MODE signal SP, whether the AUTOMATIC ENGINE BRAKING mode is selected by the DRIVE MODE selector switch 70 or not. Step S23 determines whether the vehicle speed V calculated from the output speed No of the transmission 78 as represented by the OUTPUT SPEED signal SNo is higher than a predetermined lower limit V1. Step S24 determines whether the vehicle speed is equal to or lower than a predetermined upper limit V2. Step S25 determines whether the accelerator pedal 77 is in the non-operated or released state, that is, whether or not the operating amount Ac of the accelerator pedal 77 as represented by the ACCELERATOR POSITION signal SAc is substantially zero, more precisely, reduced below a predetermined threshold (e.g., about 5%) which is close to zero. Step S26 determines whether the new gear position selected in step S15 is the overdrive position "O/D" or not. The lower and upper limits V1 and V2 define a range of the vehicle speed V in which the shifting of the transmission 78 is controlled in a special manner in connection with the engine braking. For example, the lower limit V1 is in the neighborhood of 20 km/h, while the upper limit V2 is in the neighborhood of 110 km/h. In the case that a negative decision (NO) is obtained in any of the steps S21-S26, the control flow goes to step S28 to maintain the new gear position selected in step S15. If an affirmative decision (YES) is obtained in all of the steps S21-S26, step S27 is implemented to replace the selected overdrive position "O/D" by the 3rd-gear position "3rd". It is noted that once the overdrive position "O/D" has been selected in step S15, an affirmative decision (YES) is obtained in step S26 even in a cycle following the cycle in which the 3rd-gear position "3rd" has been substituted for the overdrive position "O/D" in step S27.

Steps S27 and S28 are followed by step S29 to determine whether the content of the timer Ta is equal to or larger than the shift-delay time T1 determined in step S16. Steps S20-S29 are repeatedly implemented until an affirmative decision (YES) is obtained in step S29, that is, until the timer Ta has measured the shift-delay time T1. When the affirmative decision (YES) is obtained in step S29, step S30 is implemented to suitably energize or de-energize the solenoids S1, S2 and S3, for thereby shifting the transmission 78 to the new gear position selected in step S15 or S43, or to the 3rd-gear position "3rd" newly selected in step S27. Step S30 is followed by step S31 to reset the flags F1 and F4 to "0", and by step S32 to reset the timer Ta.

It will be understood that even when the overdrive position "O/D" has been selected in step S15 as the new gear position as a result of the negative determination (NO) in step S6, the once selected overdrive position "O/D" is replaced by the 3rd-gear position "3rd" to inhibit the shift-up action of the transmission 78 to the overdrive position "O/D", if the conditions of steps S21-S26 which include the releasing of the accelerator pedal 77 are all satisfied before step S30 is implemented or the transmission 78 is actually shifted up to the once selected new gear position "O/D", namely, before the shift-delay time T1 has elapsed. This arrangement is intended to inhibit the shift-up action of the transmission 78 to the overdrive position "O/D" and thereby avoid a decrease in the engine brake force due to the shift-up action, where the shift-up action is determined as a result of the driver's releasing of the accelerator pedal 77 to prevent a further acceleration of the vehicle during running on a downhill. Usually, the driver desires an increase in the engine brake force when the driver releases the accelerator pedal 77 during running of the vehicle on a downhill. More specifically described by reference to a example wherein the vehicle is running with the transmission 78 placed in the 2nd-gear position "2nd", with the accelerator pedal 77 operating amount Ac and vehicle speed V as indicated at point A in FIG. 9, the driver's releasing the accelerator pedal 77 to zero the operating amount Ac will cause a determination in step S6 to shift up the transmission 78 from the 2nd-gear position "2nd" to the overdrive position "O/D" (selected in step S15 as the new gear position), because the actual vehicle speed V becomes exceeds the shift-up boundary speeds Vu as calculated by the "2→3" and "3→O/D" shift-up boundaries. According to the present embodiment, however, the overdrive position "O/D" once selected as the new gear position to which the transmission 78 is shifted up is replaced in step S27 by the 3rd-gear position "3rd" if the operating amount Ac of the accelerator pedal 77 has been substantially zeroed within the shift-delay time T1 as measured from the time at which the 3rd-gear position "3rd" was selected as the new gear position. Consequently, the transmission 78 is shifted up to the 3rd-gear position "3rd". The present arrangement inhibits the transmission 78 from being shifted up to the overdrive position "O/D" if the zeroing of the operating amount Ac occurs within the predetermined shift-delay time T1.

If the accelerator pedal 77 once released is again depressed within the shift-delay time T1, the overdrive position "O/D" selected in step S15 is maintained by the implementation of step S28, and the transmission 78 is shifted up to the overdrive position "O/D" after the shift-delay time T1 has passed. In this case, the shift-up to the overdrive position "O/D" does not puzzle the driver, since the driver who immediately depresses again the once released accelerator pedal 77 does not desire a large engine braking effect. The determination in step S29 may be inserted between steps S20 and S21, so that the determinations on the conditions of steps S21-S26 are made after the shift-delay time T1 has passed.

The transmission 78 is also shifted up to the overdrive position "O/D" in the case where the operating amount Ac has not been substantially zeroed within the shift-delay time T1, due to a slow releasing movement of the accelerator pedal 77. The shift-up action in this case does not puzzle the driver, either, because the driver does not expect a large engine braking effect. In other words, there is a common tendency that the driver quickly releases the accelerator pedal 77 if the driver expects a large engine brake force, and slowly releases the accelerator pedal 77 if the driver wants a coasting of the vehicle with a small degree of engine braking effect.

Referring to the flow charts of FIGS. 6-8, there will next be described the operation of the transmission control computer 34 to determine the THROTTLE COMMAND signal SQ to be applied to the throttle control computer 35. Steps SS1-SS5 in FIG. 6, which are identical with steps S21-S25 of FIG. 5, respectively, are implemented to monitor the vehicle running conditions: position of the shift lever; position of the DRIVE MODE switch 70; vehicle speed V and position of the accelerator pedal 77. If the conditions of steps SS1-SS5 are all satisfied, step SS8 and the following steps are implemented to effect the automatic engine brake control. If a negative decision (NO) is obtained in any one of the steps SS1-SS5, the control flow goes to step SS6 of FIG. 7 to reset the flags F3 and F5 to "0", and to step SS7 to determine a desired opening TH of the throttle valve 20 in an ordinary manner as known in the art. That is, step SS7 includes an operation to calculate a throttle opening TH(Ac) on the basis of the operating amount Ac of the accelerator pedal 77 a represented by the ACCELERATOR POSITION signal SAc, and according to a data map or algorithm stored in the ROM of the computer 34. The throttle opening TH(Ac) thus obtained is used as the desired throttle opening TH, and the THROTTLE COMMAND signal SQ representative of the desired throttle opening TH is applied to the throttle control computer 35. The computer 35 in turn applies the THROTTLE CONTROL signal DTH to the throttle valve 20 so that the actual opening angle 0 of the throttle valve 20 coincides with the desired throttle opening TH represented by the THROTTLE COMMAND signal SQ received from the transmission control computer 34. Thus, the throttle valve opening $\theta$ is controlled in a feedback manner.

In step SS8 implemented if all the conditions of steps SS1-SS5 are satisfied, the computer 34 determines whether the flag F3 is set at "1" or not. Since this flag F3 is reset to "0" in step SS6 indicated above, the flag F3 is set at "0" when step SS8 is implemented for the first time. In this case, the control flow goes to step SS10 to set the currently detected vehicle speed V as a desired vehicle speed Vm. Since the flag F3 is set to "1" in step SS14 or SS19 of FIG. 7, an affirmative decision (YES) is obtained upon the second and subsequent implementations of step SS8, whereby step SS9 is implemented to compare the actual vehicle speed V with a difference (Vm−Vf) which is obtained by subtracting a predetermined value Vf from the desired vehicle speed Vm. If the actual vehicle speed V is higher than the difference (Vm−Vf), step SS11 and the following steps of FIG. 7 are implemented. If the vehicle speed V is equal to or lower than the difference (Vm−Vf), step SS10 is again implemented to update the desired vehicle speed Vm, that is, to set the current vehicle speed V as the desired vehicle speed Vm. Step SS11 and the following steps are then implemented. The predetermined value Vf is determined so that the negative decision (NO) is obtained in step SS9 to update the desired vehicle speed Vm in step SS10 when the vehicle speed V is considerably lowered by depression of the brake pedal 73, but the negative decision (NO) is not obtained in step SS9 even if the vehicle speed V is changed as a result of the feedback regulation of the throttle opening angle $\theta$ in steps R3 and R5 of FIG. 8. That is, the value Vf is determined so as to accommodate the amount of variation in the vehicle speed V which is expected to occur as a result of the feedback regulation of the throttle opening angle $\theta$.

Step SS11 of FIG. 7 is provided to determine on the basis of the BRAKE signal SB, whether the brake pedal 73 is in the depressed state or not. If the brake pedal 73 is not depressed, step SS12 and the following steps are implemented. If the brake pedal 73 is depressed by the driver who desires a further deceleration of the vehicle, a negative decision (NO) is obtained in step SS11, whereby steps SS22 and SS23 are implemented. In step SS22, the desired throttle opening TH is zeroed to increase the engine brake force, and the THROTTLE COMMAND signal SQ representative of the desired throttle opening TH=0 is applied to the throttle control computer 35 to fully close the throttle valve 20. In step SS23, the flag F5 is set to "1" to permit step S45 and the following steps of FIG. 4A to be implemented. When the automatic engine brake control is initiated, namely, when the accelerator pedal 77 is released, the brake pedal 73 is usually in the non-depressed state and the affirmative decision (YES) is obtained in step SS11, with a result of the flag F3 set to "1" in step SS14 or SS19. In this case, step S41 and the following steps of FIG. 4A are implemented to control the transmission 78 while the accelerator pedal 77 is released.

If the brake pedal 73 is not depressed, step SS11 is followed by step SS12 to reset the flag F5 to "0", and step SS12 is followed by step SS13 to determine whether the flag F1 is set at "1" or not, that is, whether a shift-up action of the transmission 78 has been determined in step S6 or not. If the flag F1 is set at "1", step SS14 is implemented to set the flag F3 to "1". Then, step SS15 is implemented to calculate a throttle opening TH1 (%) on the basis of the selected new gear position (selected in step S15) and the current vehicle speed, and set the calculated opening TH1 as the desired throttle opening TH. For instance, the above calculation is achieved by interpolation using a stored data map as indicated in the table of FIG. 10, depending upon the selected new gear position and the currently detected vehicle speed V, so that the calculated throttle opening TH1(%) permits the vehicle to run at the current vehicle speed V on a level road surface even after the transmission 78 is shifted up to the selected new gear position. In other words, the calculated throttle opening TH1 permits the effective vehicle drive force to be zero, that is, permits the vehicle drive force which is equal to the running resistance of the vehicle. The calculated throttle opening TH1 is set as the desired throttle opening TH, and the THROTTLE COMMAND signal SQ representative of the desired throttle opening TH is applied to the throttle control computer 35, so that the actual opening angle $\theta$ of the throttle valve 20 coincides with the desired throttle opening TH, that is, the throttle opening TH calculated in step SS15.

Figure 11:
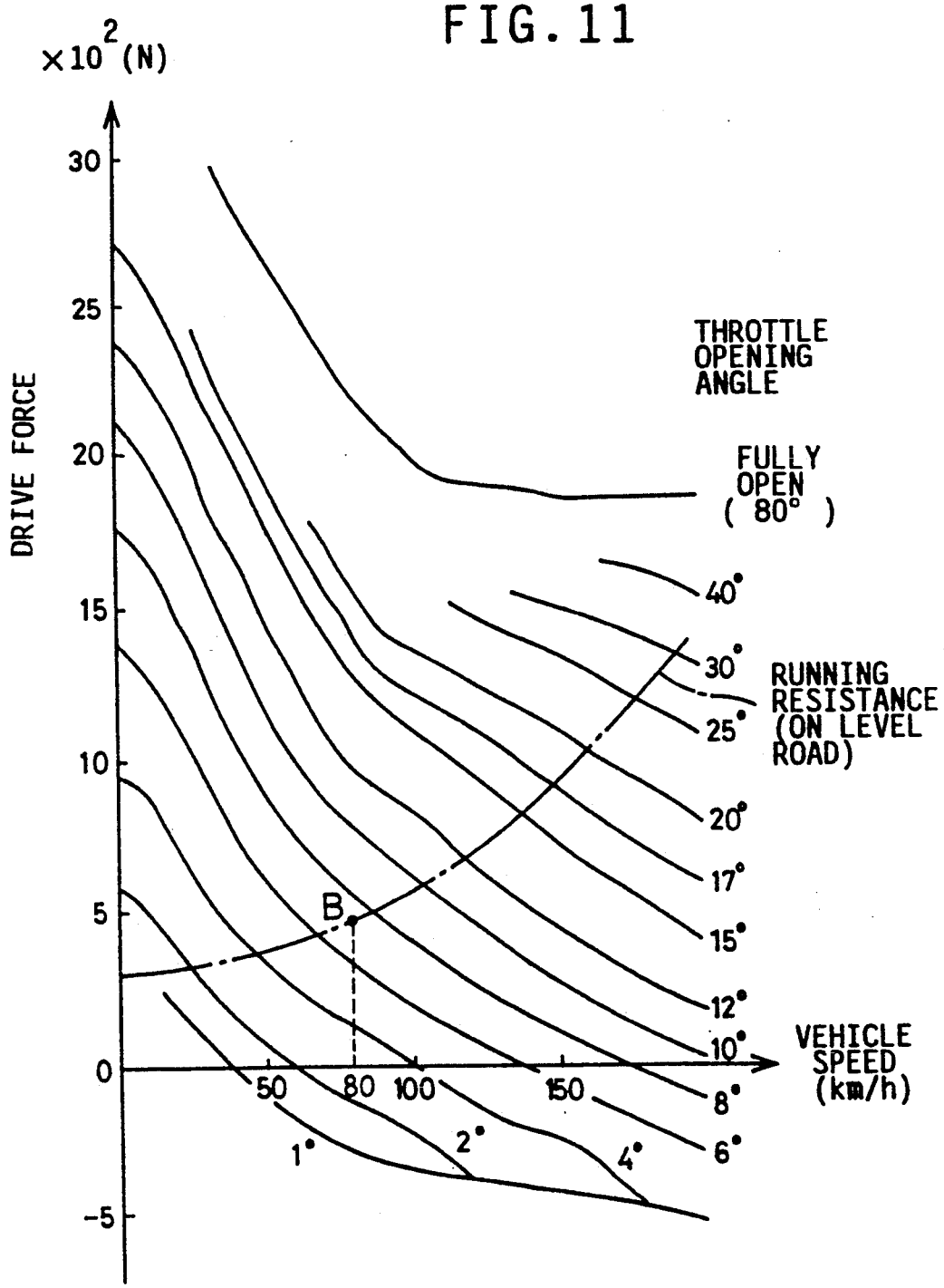
FIG. 11 is a graph showing experimental data on which the data map of FIG. 10 is formulated.
Figure 12:
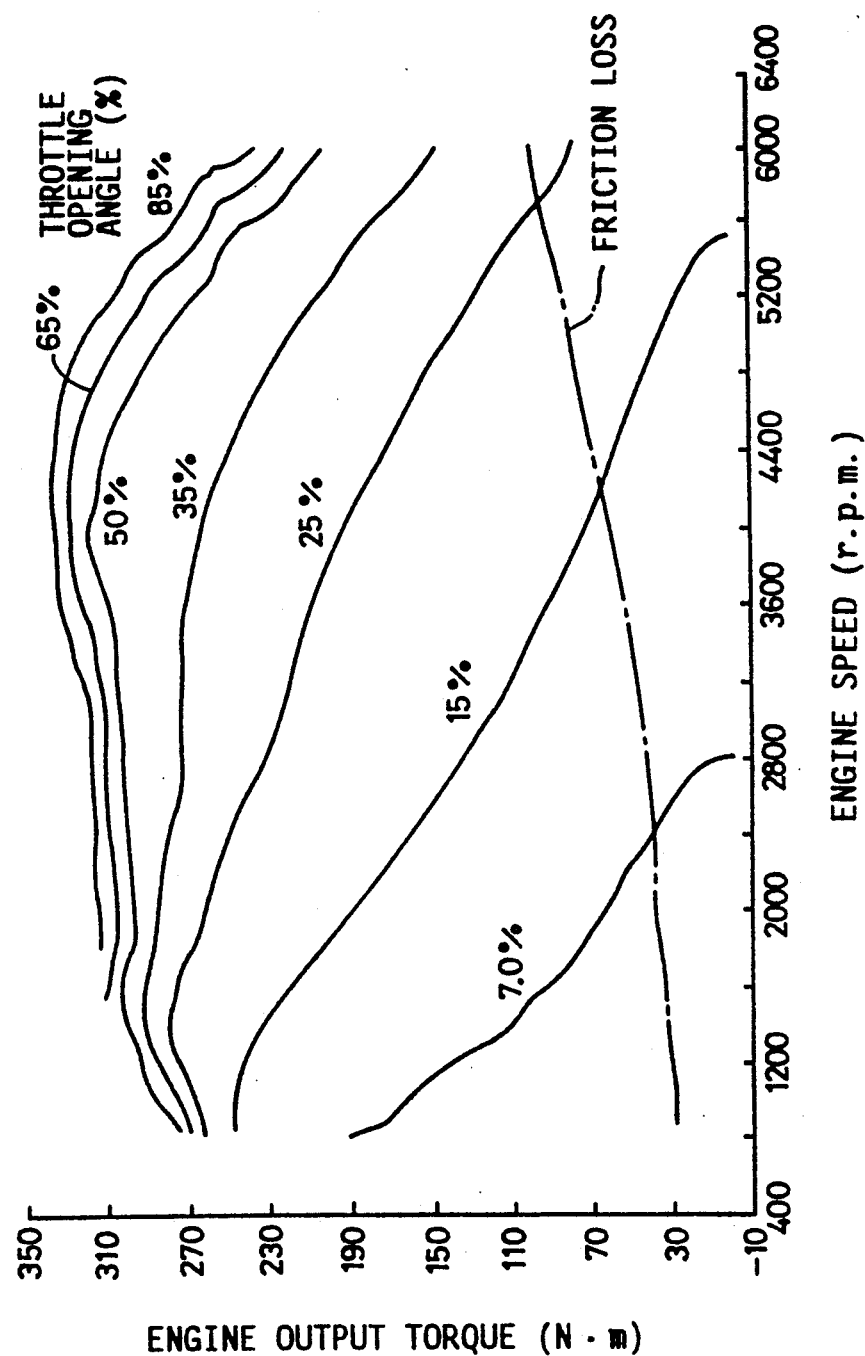
FIG. 12 is a graph showing the output characteristics of the engine for which the experimental data of FIG. 11 were obtained.

The data map of FIG. 10 includes the desired throttle opening values TH corresponding to respective combinations of the new gear position of the transmission 78 and predetermined vehicle speeds V. The desired throttle opening values TH are determined from experimental data as indicated in FIG. 11, so that the vehicle drive force produced at the determined throttle opening values TH is equal to the vehicle running resistance. The data shown in FIG. 11 were obtained for a vehicle with an engine whose output characteristics are indicated in FIG. 12, where the transmission 78 is placed in the overdrive position "O/D" whose total gear ratio is 2.8905 and whose gear transmission efficiency is 0.855 and where the effective tire radius is 0.306 meter. For example, the throttle opening TH1 (%) when the vehicle speed V is 80 km/h is obtained as follows. That is, the throttle opening angle which permits the drive force equal to the running resistance on a level road surface at 80 km/h is about 7.4° as indicated at point B in FIG. 11. Since the throttle opening angle is 80° when the throttle valve 20 is fully open, the throttle opening TH1 in the form of the percentage with respect to the fully open angle 80° is equal to (7.4/80)×100=9.3. Therefore, the throttle opening $TH_{45}$ in FIG. 10 for the overdrive position "O/D" and vehicle speed V of 80 km/h is 9.3%. Thus, the throttle opening values $TH_{41}$–$TH_{47}$ for the vehicle speeds V of 40, 50, 60, 70, 80, 90 and 100 km/h are determined for the overdrive position "O/D". Similarly, the throttle opening values $TH_{31}$–$TH_{37}$, $TH_{21}$–$TH_{27}$ and $TH_{11}$–$TH_{17}$ for the 3rd-gear, 2nd-gear and 1st-gear positions "3rd", "2nd" and "1st" are determined. As is apparent from FIG. 11, the throttle opening values TH1 increase with the vehicle speed V. Further, the throttle opening values TH1 increase with the speed ratio of the gear position. In this respect, the speed ratios of the 1st-gear and 2nd-gear positions "1st" and "2nd" are larger than those of the 3rd-gear or overdrive positions "3rd" and "O/D".

When the flag F1 is not set to "1" in step S7 of FIG. 4B with the affirmative decision (YES) obtained in step S6, or when the flag F1 is reset to "0" in step S31 of FIG. 5, a negative decision (NO) is obtained in step SS13, and the control flow goes to step SS16 to determine whether a flag F6 is set at "0" or not. If the flag F6 is set at "0", step SS17 is implemented to determine whether the flag F3 is set at "1" or not. If the flag F3 is set at "1", step SS18 is implemented to determine whether the transmission 78 is in the process of being shifted. This determination may be effected by determining whether the following equation (1) is satisfied or not:

$$Nt \approx No \times i \tag{1}$$

When the solenoids S1, S2 and S3 are suitably energized or de-energized in step S30 of FIG. 5 to shift the transmission 78, the clutches C and brakes B of the transmission 78 first slip, and the ratio Nt/No of the input speed Nt to the output speed No of the transmission 78 eventually substantially coincides with the speed radio i of the gear position to which the transmission is finally shifted. Therefore, the transmission 78 is considered to be in the process of a shifting action if the equation (1) is not satisfied, and not in the process of a shifting action if the equation (1) is satisfied. It is noted that the equation (1) is formulated with the detecting errors of the speeds Nt and No taken into account.

If a negative decision (NO) is obtained in step SS18, that is, if the transmission 78 is not in the process of a shifting action, step SS21 is implemented to start a throttle control routine for automatic engine brake control, as described below by reference to the flow chart of FIG. 8. If the transmission 78 is in the process of a shifting action, step SS20 is implemented. When the automatic engine brake control is initiated, the flag F3 is not set at "1" and a negative decision (NO) is obtained in step SS17. In this case, step SS19 is implemented to set the flag F3 to "1", and step SS20 is then implemented to calculate a throttle opening TH2(%) according to the data map of FIG. 10, on the basis of the current gear position of the transmission 78 and the current vehicle speed V, so as to permit the vehicle to run at the current vehicle speed V on a level road surface in the new gear position of the transmission 78, with the drive force equal to the running resistance of the vehicle (with the effective drive force being substantially zero), in the same manner as used for the throttle opening TH1. The calculated throttle opening TH2 is set as the desired throttle opening TH, and the THROTTLE COMMAND signal SQ representative of the desired throttle opening TH is applied to the throttle control computer 35, so that the actual opening angle $\theta$ of the throttle valve 20 coincides with the throttle opening TH2. The intake air quantity of the engine 10 changes with the throttle opening angle $\theta$ which is determined by the throttle opening TH2. As a result, the engine brake force is reduced until the effective drive force is zeroed on a level road surface.

It will be understood from the above description that the throttle opening angle $\theta$ is first increased to zero the effective drive force (drive force equal to the running resistance), as a result of the implementation of step SS20 following steps SS17 and SS19 immediately after the releasing of the accelerator pedal 77 which triggers the automatic engine brake control. This arrangement is intended to avoid an excessive engine brake force, and assure an optimum engine braking effect suitable to the gradient of the downhill on which the driver releases the accelerator pedal 77. It is also noted that the above step SS20 for opening the throttle valve 20 to zero the effective drive force is implemented during a shifting action of the transmission 78, for rapidly increasing the engine speed NE to thereby reduce the shifting time, in particular the time required to shift down the transmission 78 (shift-down to the gear position selected in step S43 with the flag F4 set at "1") for increasing the engine brake force. The reduction of the shifting time is effective to minimize an increase in the vehicle speed V during the shifting action, which increase may occur due to a reduced engine braking effect during the shifting action.

The throttle control routine for automatic engine brake control in step SS21 is formulated to feedback control the throttle valve opening $\theta$ so that the actual vehicle speed V will not exceed the desired vehicle speed Vm determined in step SS10 of FIG. 6, more precisely, so that the actual speed V substantially coincides with the desired speed Vm. The details of this throttle control routine are illustrated in the flow chart of FIG. 8. The routine includes step R1 to determine whether the flag F4 is set at "0" or not. If the flag F4 is set at "0", step R2 is implemented to determine whether the actual throttle opening $\theta$ represented by the THROTTLE OPENING signal S$\theta$ is smaller than a predetermined threshold value $\theta1$ or not. The threshold value $\theta1$ is a relatively small value in the neighborhood of 5%. The determination in step R2 may be accomplished by detecting an engine idling signal which is generated when the throttle valve 20 is almost fully closed. If the actual throttle opening $\theta$ is equal to or larger than the threshold value $\theta1$, that is, in the case where it is possible to increase the engine brake force by reducing the throttle opening $\theta$, step R3 is implemented to calculate a throttle opening TH3(%) as a function of a difference between the actual vehicle speed V and the desired vehicle speed Vm, so that the actual vehicle speed V is made substantially equal to the desired speed Vm, in a feedback manner.

Step R3 is followed by step R4 to determine whether the calculated throttle opening TH3 is smaller than an optimum throttle opening THm(%) which permits the vehicle to run at the desired speed Vm on a level road surface, or which permits the effective vehicle drive force to be zero, or the drive force equal to the running resistance of the vehicle. The optimum throttle opening THm(%) is calculated by interpolation according to the data map of FIG. 10, on the basis of the currently established gear position of the transmission 78 and the desired vehicle speed Vm. If the throttle opening TH3 calculated in step R3 is smaller than the optimum throttle opening THm, step R5 is implemented to set the throttle opening TH3 as the desired throttle opening TH, which is represented by the THROTTLE COMMAND signal SQ applied to the throttle control computer 35 to control the throttle valve 20 so that the actual throttle opening $\theta$ coincides with the throttle opening TH3 (desired throttle opening TH). With these steps R3-R5 repeatedly implemented, the throttle opening $\theta$ is regulated such that the actual vehicle speed V substantially coincides with the desired speed Vm, so that the vehicle runs with a suitable engine brake force, at the desired speed Vm which is obtained immediately after the accelerator pedal 77 is released, or which is updated as the vehicle speed V is lowered with the brake pedal 73 depressed. The present feedback control of the throttle opening $\theta$ for substantial coincidence of the actual vehicle speed V with the desired speed Vm provides a suitably controlled engine brake force for substantial coincidence of the vehicle speed V with the desired speed Vm irrespective of a variation in the gradient of the road surface. The present arrangement prevents reduction in the vehicle speed V which may occur unexpectedly to the vehicle driver, due to an excessive engine brake force upon reduction of the road surface gradient.

If the throttle opening TH3 is equal to or larger than the optimum throttle opening THm, a negative decision (NO) is obtained in step R4, whereby step R6 is implemented to set the optimum throttle opening THm as the desired throttle opening TH. As a result, the THROTTLE COMMAND signal SQ representative of the throttle opening TH is applied to the throttle control computer 35, to control throttle valve 20 so that the actual throttle opening $\theta$ coincides with the throttle opening THm. In the feedback control of the throttle opening $\theta$ according to the throttle opening TH3 in step R5, the engine brake force is changed for substantial coincidence of the actual vehicle speed V with the desired speed Vm irrespective of a variation in the road surface gradient, as described above. This feedback control causes an increase in the throttle opening $\theta$ to maintain the actual vehicle speed V at the desired speed Vm, even when the road is changed from a downhill road to an uphill road. Usually, the driver expects a decrease in the vehicle speed V during running on an uphill in the engine braking mode. During running of the vehicle on a level road surface, the throttle opening THm is just enough to maintain the vehicle speed V at the desired speed Vm. Therefore, this throttle opening value THm is used as the upper limit of the throttle opening TH3 used for the feedback control of the throttle opening $\theta$ in step R5. That is, where the throttle opening TH3 is equal to or larger than the upper limit THm, step R6 is implemented to control the throttle opening according to the optimum throttle opening THm. In this case, the vehicle speed V is maintained at the desired speed Vm while the vehicle is running on a downhill or a level road, but the vehicle speed V is lowered below the desired level Vm when the vehicle running on an uphill. Thus, the vehicle speed V is lowered according to the gradient of the uphill, as expected by the driver. It is noted that the optimum throttle opening THm corresponds to the reference intake air quantity which permits the actual vehicle speed V to be maintained at the desired level Vm as long as the road surface is substantially level.

If the throttle valve 20 is almost fully closed and the engine brake force cannot be increased any longer, an affirmative decision (YES) is obtained in step R2. As a result, steps R7–R9 are implemented. In step R7, the flag F4 for increasing the engine brake force is set to "1", and the flag F6 for delaying a change in the throttle opening $\theta$ is set to "1". Consequently, step R7 permits step S43 of FIG. 4A and step SS24 and following steps of FIG. 7 to be implemented. In step R8, a throttle opening TH4(%) is calculated by interpolation using the data map of FIG. 10, on the basis of the selected new gear position (to which the transmission is shifted down) of the transmission 78 and the current vehicle speed V. The throttle opening TH4(%) permits the vehicle to run at the current speed V on a level road surface, with the drive force equal to the running resistance of the vehicle, as described above. In the next step R9, a throttle-delay time T2 is determined, and a timer Tb for measuring the throttle-delay time T2 is reset. The throttle-delay time T2 is determined o the basis of the shift-delay time T1, and various parameters such as the selected new gear position (next lower-gear position) of the transmission 78, vehicle speed V and the temperature of the working fluid of the hydraulic control circuit 150, so that the throttle opening $\theta$ is increased to the value determined by the throttle opening TH4, so as to increase the engine speed NE in timed relation with the initiation of slipping of the clutches C and brakes B of the transmission 78 upon a shift-down action according to the determination in step S43.

As a result of the setting of the flag F6 to "1" in step R7 of the throttle control routine of step SS21 of FIG. 7, a negative decision (NO) is obtained in step SS16, and the control flow goes to step SS24 to determine whether the content of the timer Tb is equal to or larger than the throttle-delay time T2. When the time T2 has been measured by the timer Tb, step SS25 is implemented to set the throttle opening TH4 as the desired throttle opening TH, whereby the THROTTLE COMMAND signal SQ representative of the desired throttle opening TH is applied to the throttle control computer 35. Accordingly, the actual opening $\theta$ of the throttle valve 20 is controlled so as to be equal to the desired throttle opening TH4. Step SS25 is followed by step SS26 to reset the flag F6 to "0". As indicated above, the throttle-delay time T2 which should elapse before the throttle opening $\theta$ is changed is determined so that the engine speed rises when the clutches C and brakes B begin to slip in an early stage of the shift-down action of the transmission 78. Before step S30 is implemented to shift the transmission 78, the negative decision (NO) is obtained in step SS18, and step SS21 is implemented. However, since the flag F4 remains "1" until step S30 is implemented, the negative decision (NO) is obtained in step R1 of step SS21, and steps R2-R9 are not implemented. When step S30 is implemented, the affirmative decision (YES) is obtained in step SS18, and step SS21 will not be implemented until the transmission 78 has been shifted.

In the present embodiment, the vehicle speed V at the time the accelerator pedal 77 is released is set in step SS10 as the desired vehicle speed Vm, and steps R3 and R5 are implemented to feedback control the throttle opening $\theta$ so that the actual vehicle speed V coincides with the desired speed Vm. Accordingly, when the driver releases the accelerator pedal 77 to avoid a further acceleration of the vehicle on a downhill, the vehicle speed V upon releasing of the accelerator pedal 77 is used as the desired speed Vm, so that the vehicle speed V is maintained at a level expected by the driver, due to the engine braking effect. That is, the engine brake force is suitably controlled to keep the actual vehicle speed V substantially at the desired speed Vm, irrespective of a variation in the road surface gradient. This arrangement prevents an excessive engine brake force and a decrease in the vehicle speed V unexpected to the driver even when the road surface gradient is reduced. In particular, the present embodiment permits the vehicle speed V to approach the desired speed Vm in a relatively short time by the feedback control of the throttle opening $\theta$, while assuring an optimally controlled engine braking effect.

Further, the present embodiment is adapted such that when the throttle opening TH3 obtained in step R3 exceeds the throttle opening THm which permits the vehicle to run at the desired speed Vm on a level road surface, the throttle opening THm is set in step R6 as the desired throttle opening TH. When the road is changed from a downhill to an uphill, this arrangement assures a decrease of the vehicle speed V below the desired speed Vm, according to the change in the road gradient, as expected by the driver.

It will therefore be understood from the foregoing description of the present embodiment that the portions of the transmission control computer 34 assigned to implement steps SS5, SS8 and SS10 of FIG. 6 constitute means for determining or calculating the desired vehicle speed Vm, while the portions of the computer 34 assigned to implement steps R3 and R5 cooperate with the throttle control computer 35 and the throttle valve 20 to constitute means for controlling the intake air quantity of the engine 10 s that the actual vehicle speed V approaches the desired speed Vm. Further, the portions of the computer 34 assigned to implement steps R4 and R6 constitute means for limiting the intake air quantity to a value not exceeding a predetermined reference value which permits the vehicle to run at the desired speed if the vehicle runs on a level road surface. The speed sensor 82 adapted to detect the output speed No of the transmission 78 serves as a vehicle speed sensor for detecting the running speed V of the vehicle.

If the vehicle speed V is lowered as a result of the driver's depression of the brake pedal 73 to further decelerate the vehicle in the automatic engine brake control mode, step SS10 is implemented each time the negative decision (NO) is obtained in step SS9, whereby the desired vehicle speed Vm is updated, namely, lowered as the actual vehicle speed V is lowered. When the brake pedal 73 is released after the actual vehicle speed V is lowered to a level desired by the driver, the speed V at the time of the driver's releasing of the brake pedal 73 is used as the desired speed Vm, on which the engine brake force is controlled by regulating the throttle opening $\theta$ and shifting down the transmission 78. This arrangement avoids an insufficient engine braking effect after the brake pedal 73 is released. For example, when the driver depresses the brake pedal 73 to decelerate the vehicle during running on a straight downhill and releases the brake pedal 73 shortly before the lower end of the downhill which precedes a curve, the above arrangement is effective to prevent acceleration of the vehicle during running along the curve, thus improving the ease of control and steerability of the vehicle.

It will also be understood that the portions of the computer 34 assigned to implement steps SS5, SS8 and SS10 of FIG. 6 constitute desired-speed determining means for determining the desired speed Vm of the vehicle on the basis of the actual speed V detected when the accelerator pedal 77 is released, and that the portions of the computer 34 assigned to implement steps SS9 and SS10 constitute updating means for updating the desired vehicle speed Vm when the actual speed V becomes smaller than the desired speed Vm by a predetermined value or more. It is also to be understood that the portions of the computer 34 assigned to implement steps R3, R5, R7 of FIG. 7, steps S42 and S43 of FIG. 4A and step S30 of FIG. 5 cooperate with the throttle control computer 35 and the throttle valve 20 to constitute engine brake control means for controlling the engine brake force.

When the automatic engine brake control mode is established with the accelerator pedal 77 released, the throttle opening $\theta$ is first increased in step SS20 to the value TH2 which causes the effective vehicle drive force to be zeroed, and is then controlled in steps R3 and R5 so that the vehicle speed V coincides with the desired speed Vm obtained at the time the accelerator pedal 77 was released. This arrangement prevents an excessive engine brake force, and assures an optimum engine brake force even when the road surface gradient is relatively small. When the transmission 78 is shifted down to increase the engine brake force, too, the throttle opening $\theta$ is increased in step SS25 or SS20 to the value TH4, TH2 so that the effective drive force is zeroed, and is controlled in steps R3 and R5 after the shift-down action of the transmission 78. Thus, the shift-down action will not cause an abrupt increase in the engine brake force.

If the brake pedal 73 is depressed while the accelerator pedal 77 is in the released state, steps R3 and R5 are not implemented to control the throttle valve, but the throttle valve 20 is fully closed in step SS22, and the transmission 78 is shifted down in steps S45, S46, S48, S30, to increase the engine brake force to decelerate the vehicle as expected by the driver. This arrangement assures the engine braking effect as expected by the driver who is depressing the brake pedal 73 to decelerate the vehicle, and thus permits the driver to decelerate the vehicle as desired, without a need of increasing the depressing force on the brake pedal 73.

It will therefore be understood that the portion of the computer 34 assigned to implement step SS5 constitutes means for determining whether the accelerator pedal 77 is in the released state, and that the portions of the computer 34 assigned to implement steps R3, R5, R7 of FIG. 8, steps S42, S43 of FIG. 4A and step S30 of FIG. 5 cooperate with the computer 35 and the throttle valve 20 to constitute first control means for increasing the engine brake force as the actual vehicle speed V is increased while the accelerator pedal 77 is in the released state. Further, the portions of the computer 34 assigned to implement steps SS11, SS22, SS23 of FIG. 7 and steps S41, S45, S46, S48 of FIG. 4A constitute second control means operable in place of the first control means while the brake pedal 73 is depressed, for controlling the engine brake force such that the engine brake force controlled by the second control means is larger than that controlled by the first control means.

The BRAKE LAMP switch 72 serves as means for detecting that the brake pedal 73 is depressed.

Figure 13:
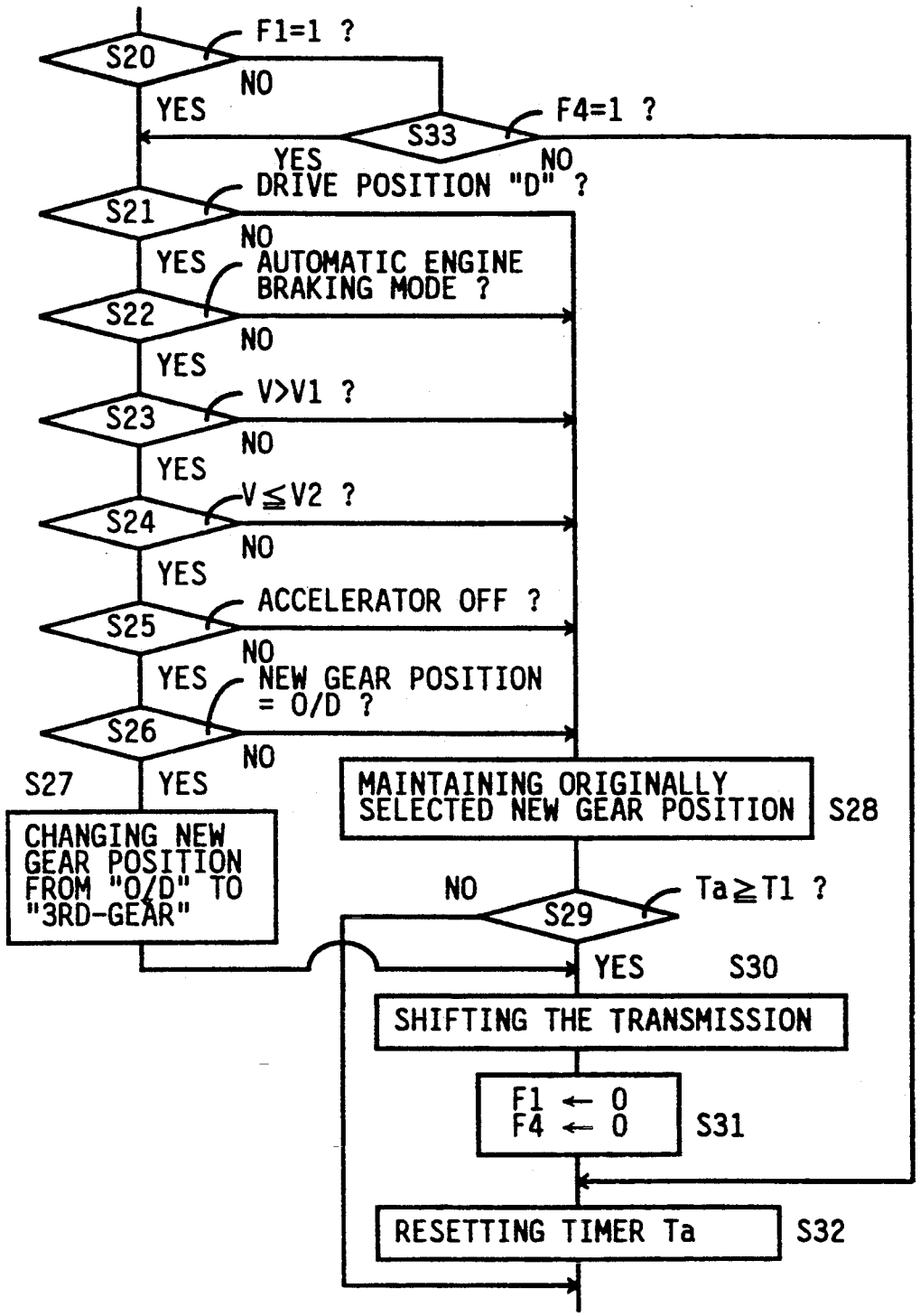
FIG. 13 is a flow chart corresponding to that of FIG. 5, showing an operation to shift the transmission according to another embodiment of this invention.

In the present embodiment, the 3rd-gear position "3rd" selected in step S27 as the new gear position in place of the overdrive position "O/D" is changed to the overdrive position "O/D" in step S28 if the accelerator pedal 77 is depressed before the shift-delay time T1 has passed. However, step S27 may be followed by step S30, rather than step S29, as indicated in FIG. 13, so that once the 3rd-gear position "3rd" is substituted for the overdrive position "O/D" in step S27, the transmission 78 is immediately shifted in step S30 to the 3rd-gear position "3rd".

Figure 14:
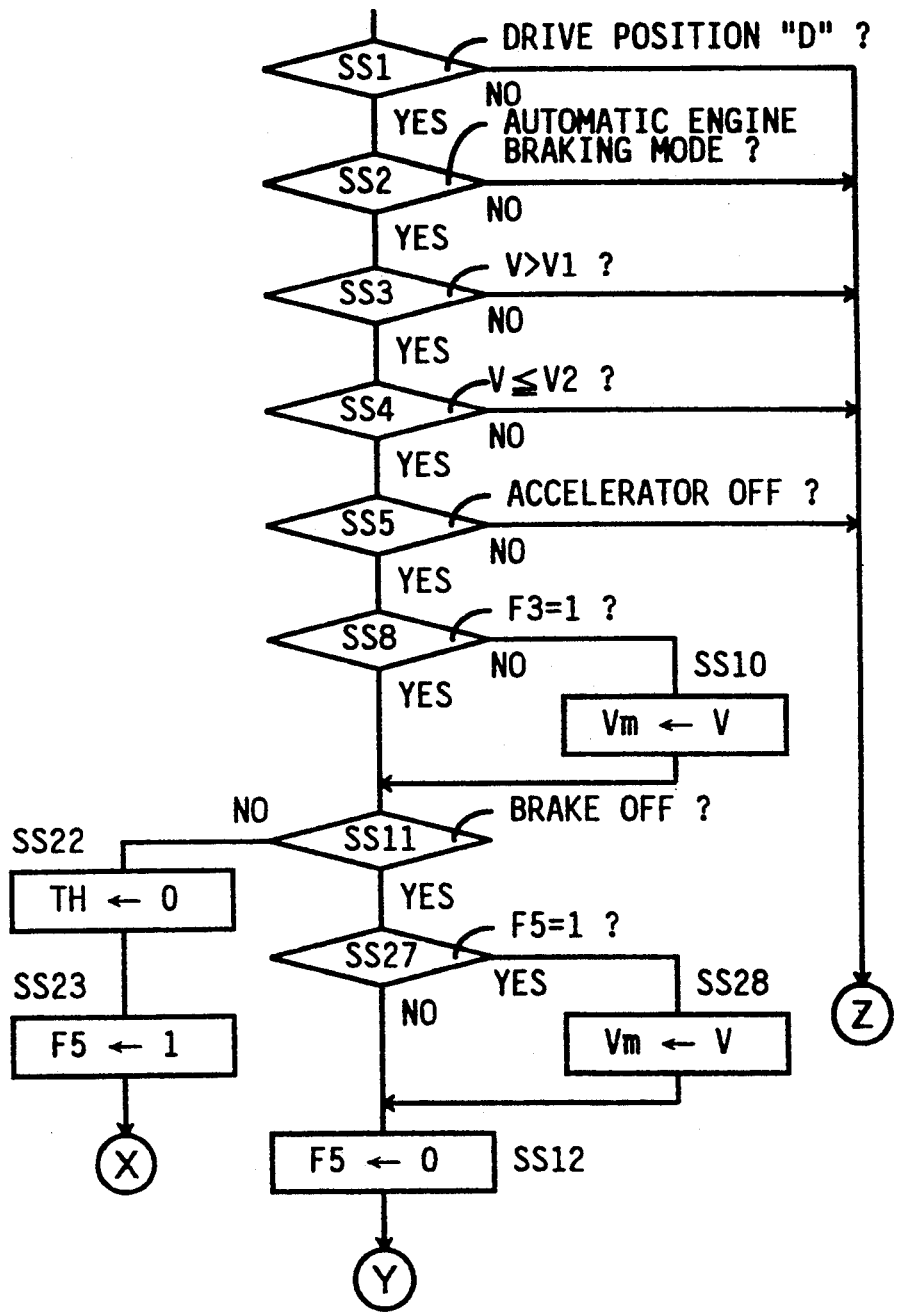
FIGS. 14 and 15 are flow charts showing an operation to control the throttle valve according to a further embodiment of the invention.
Figure 15:
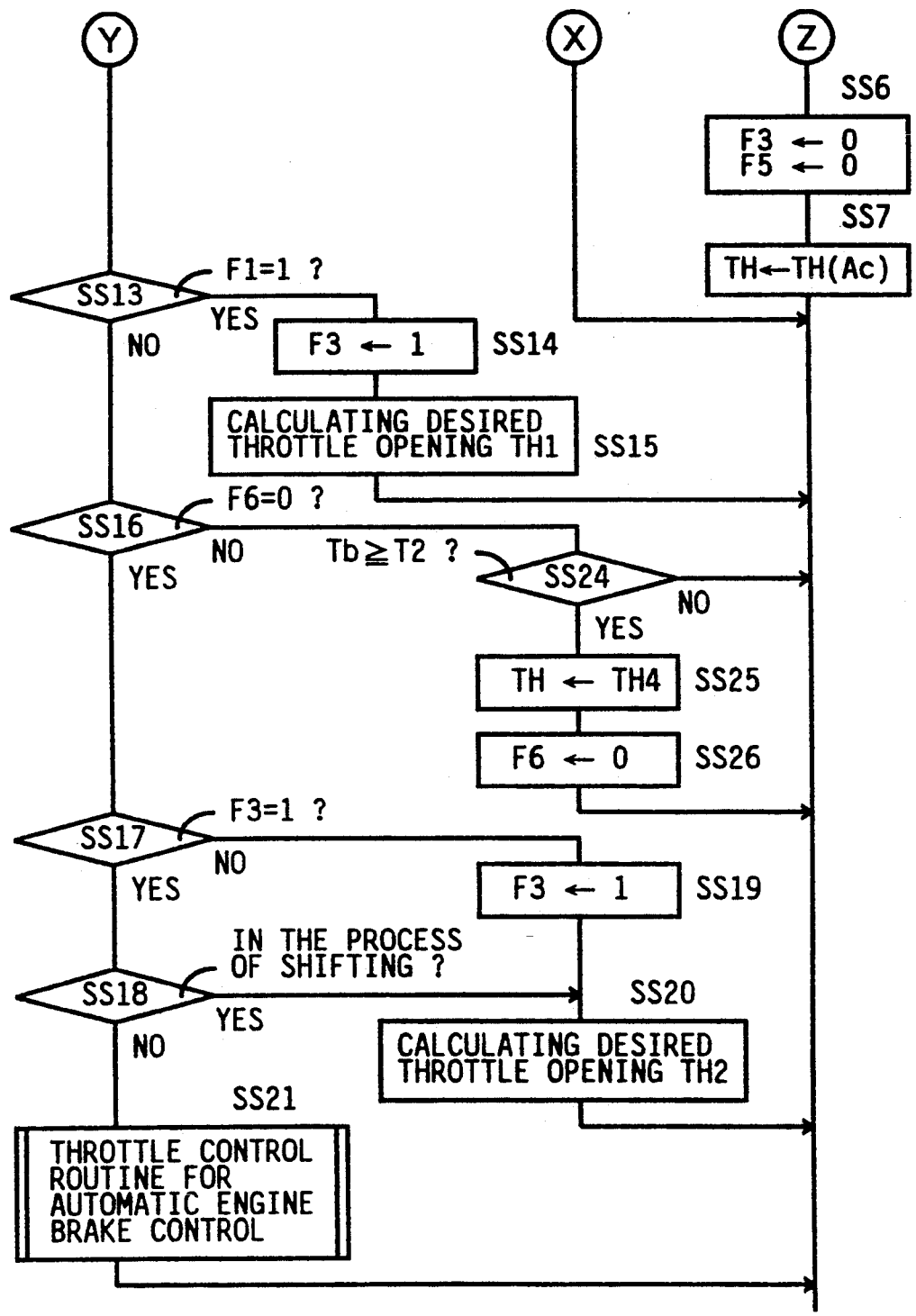
Figure 16:
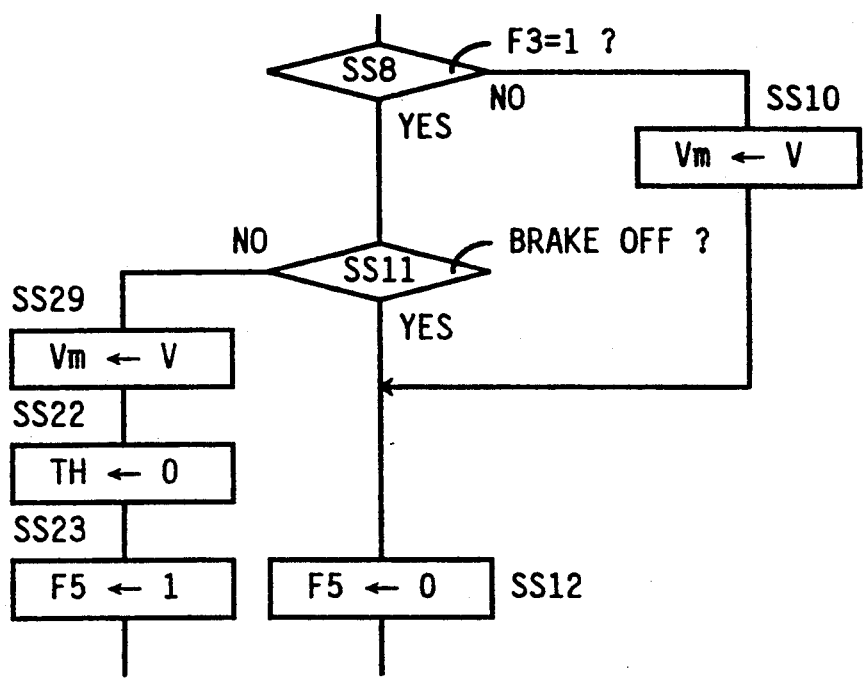
FIG. 16 is a flow chart showing an operation to control the throttle valve according to a still further embodiment of the present invention.

In the embodiment of FIGS. 4–8, step SS10 is implemented each time the negative decision (NO) is obtained in step SS9 as a result of reduction of the vehicle speed V, whereby the desired vehicle speed Vm is updated with the actual vehicle speed V. However, it is possible to omit step SS9 and insert steps SS27 and SS28 between steps SS11 and SS12, as indicated in the flow charts of FIGS. 14 and 15, so that the desired vehicle speed Vm is updated on the basis of the vehicle speed V detected when the brake pedal 73 is released. Alternatively, step SS29 may be provided between steps SS11 and SS22, as indicated in the flow chart of FIG. 16, so that the desired vehicle speed Vm is updated on the basis of the actual speed V detected while the brake pedal 73 is in the depressed state. In this case, the desired speed Vm is finally updated on the basis of the actual speed V detected when the brake pedal 73 is released. These modified arrangements also prevent an abrupt acceleration of the vehicle due to an insufficient engine braking effect after the brake pedal 73 is released, and assure easy control of the vehicle as described above with respect to the first embodiment. In these modified embodiments, the portions of the computer 34 assigned to implement steps SS11, SS23, SS27 and SS28 of FIGS. 14 and 15, or steps SS11 and SS29 of FIG. 16 constitute updating means for updating the desired vehicle speed Vm when the brake pedal 73 is released.

While the present invention has been described in detail in its presently preferred embodiments, the invention may be embodied otherwise.

In the illustrated embodiments, the engine brake force is controlled by controlling the throttle opening $\theta$ to control the intake air quantity and shifting down the transmission 78. However, the intake air quantity may be controlled by controlling the idling speed control valve 38. Further, the engine brake force may be controlled by utilizing engine control devices such as an alternator, as well as the device for controlling the intake air quantity. When the vehicle is equipped with a belt-and-pulley type continuously variable transmission, the engine brake force may be controlled by changing the speed ratio of the transmission by changing the effective diameters of the variable-diameter pulleys of the transmission.

While the throttle opening $\theta$ is controlled by the throttle control computer 35, the principle of the present invention is equally applicable to a vehicle of the type in which the throttle valve 20 is mechanically linked with the accelerator pedal 77. In this case, the operating amount Ac of the accelerator pedal 77 used in the illustrated embodiments may be replaced by the opening $\theta$ of the throttle valve.

In the illustrated embodiments, the DRIVE MODE selector switch 70 should be placed in the AUTO- MATIC ENGINE BRAKING mode to effect the automatic engine brake control in step SS8 and the following steps. However, the automatic engine brake control may be effected when the POWER DRIVE mode is established, or irrespective of the drive mode selected by the selector switch 70. A switch to effect the automatic engine brake control may be provided independently of the DRIVE MODE selector switch 70.

Although the vehicle speed V should be within a predetermined range between V1 and V2 as monitored in steps SS3 and SS4 to effect the automatic engine brake control, this condition is not essential, and the range may be suitably modified. Further, one or more conditions other than those of steps SS1–SS5 may be added to effect the automatic engine brake control.

In the illustrated embodiments, the actual vehicle speed V at the time the accelerator pedal 77 or brake pedal 73 is released is used as the desired vehicle speed Vm, this desired speed Vm may be suitably determined on the basis of the actual speed V, for example, by adding or subtracting an expected amount of detecting error of the speed V.

Although the illustrated embodiments are adapted to feedback control the throttle opening θ so that the actual vehicle speed V coincides with the desired speed Vm, other methods of controlling the throttle opening θ may be employed For instance, the throttle opening θ may be controlled by incrementing or decrementing it by a predetermined amount ΔTH per cycle. The predetermined value Vf used in step SS9 is determined in view of an expected amount of variation in the vehicle speed V which occurs during or by the control of the throttle opening θ.

In the illustrated embodiments, when a shift-down action of the transmission 78 is determined to be effected to increase the engine brake force, steps SS20 and SS25 are implemented to increase the throttle opening θ to a level which permits the vehicle to run with a drive force just equal to the vehicle running resistance, namely, a level which permits the effective drive force to be zeroed. After the transmission 78 is shifted down, the throttle opening θ is gradually reduced by step R3 and the following steps. However, the throttle opening θ after the shift-down action may be controlled so as to provide a brake torque which is substantially equal to or slightly larger than the brake torque before the shift-down action. Like the data map of FIG. 10 used in the illustrated embodiments, the data map to obtain the throttle opening in this case may be prepared from experimental data as shown in FIG. 11, on the basis of the selected gear position and the transmission 78, vehicle speed V and other parameters.

While the illustrated embodiments are adapted to inhibit the transmission 78 from being shifted up to the overdrive position "O/D", it is possible to inhibit a shift-up action from the 2nd-gear position "2nd" to the 3rd-gear position "3rd" and even a shift-up action from the 1st-gear position "1st" to the 2nd-gear position "2nd" when the appropriate conditions to effect the automatic engine brake control are satisfied. The number of the gear positions of the transmission 78 may be changed as needed.

Although the illustrated embodiments use the engine control computer 32, transmission control computer 34 and throttle control computer 35 in the form of three separate units, these computers may be replaced by a single computer.

The first control means used in the illustrated embodiments to control the throttle valve 20 to thereby control the engine brake force so that the actual vehicle speed V coincides with the desired speed Vm may be modified to control the engine brake force so as to decelerate the vehicle.

Further, the second control means to increase the engine brake force by fully closing the throttle valve 20 and shifting down the transmission 78 may be modified to increase the engine brake force by simply fully closing the throttle valve 20, or simply shifting down the transmission.

It is to be understood that the present invention may be embodied with various other changes, modifications and improvements, which may occur to those skilled in the art, in the light of the foregoing teachings, without departing from the scope and sprint of the invention defined in the following claims.

What is claimed is:

1. An apparatus for controlling an engine brake force of a motor vehicle having an engine, an accelerator pedal, and an automatic transmission which is shifted to change the speed ratio according predetermined shifting conditions, said engine brake force being produced by said engine when said accelerator pedal is in a released state, said apparatus comprising:
   an accelerator position sensor for detecting an operating amount of said accelerator pedal;
   a vehicle speed sensor for detecting an actual running speed of the vehicle;
   desired-speed determining means for determining whether said operating amount of the accelerator pedal detected by said accelerator position sensor is reduced below a predetermined threshold which is close to zero, and determining a desired speed of the vehicle on the basis of said actual running speed detected by said vehicle speed sensor when said operating amount is reduced below said predetermined threshold;
   intake air control means for controlling an intake air quantity of said engine such that said actual running speed approaches said desired speed; and
   limiting means for limiting said intake air quantity controlled by said intake air control means, to a value not exceeding a reference value which is determined on the basis of said speed ratio of the automatic transmission and said actual running speed of the vehicle, so as to permit said actual running speed to be maintained at said desired speed when the vehicle runs on a level road surface.

2. An apparatus according to claim 1, wherein said intake air control means includes means for determining a difference between said actual running speed of the vehicle and said desired speed, and means for determining said intake air quantity as a function of the determined difference.

3. An apparatus according to claim 1, wherein said limiting means includes means for determining said reference value of said intake air quantity, and means for using said reference value in place of the intake air quantity as obtained by said intake air control means, when said intake air quantity as obtained by said intake air control means exceeds said reference value.

4. An apparatus according to claim 3, wherein said limiting means determines said reference value on the basis of said actual running speed of the vehicle when said operating amount of said accelerator pedal is reduced below said predetermined threshold, and depending upon one of a plurality of gear positions of said automatic transmission which is selected when said operating amount is reduced below said predetermined threshold.

5. An apparatus according to claim 1, wherein said intake air control means includes a throttle valve, and an electronic device for controlling an opening of said throttle valve so as to feedback control said intake air quantity so that said actual running speed of the vehicle coincides with said desired speed.

6. An apparatus according to claim 1, further comprising monitoring means for determining whether a plurality of conditions to effect automatic control of said engine brake force are satisfied, said plurality of conditions including a condition in which said accelerator pedal is in said released state, said intake air control means and said limiting means being operated in response to a determination of said monitoring means that all of said plurality of conditions are satisfied.

7. An apparatus according to claim 6, wherein said plurality of conditions further include a condition in which said actual running speed of the vehicle is within a predetermined range.

8. An apparatus according to claim 6, further comprising a switch for establishing an automatic engine brake control mode, and wherein said plurality of conditions further include a condition in which said automatic engine brake control mode is established.

9. An apparatus for controlling an engine brake force of a motor vehicle having an engine, an accelerator pedal, a brake pedal, and an automatic transmission which is shifted to change the speed ratio according to predetermined shifting conditions, said engine brake force being produced by said engine when said accelerator pedal is in a released state, said apparatus comprising:
an accelerator position sensor for detecting an operating amount of said accelerator pedal;
a vehicle speed sensor for detecting an actual running speed of the vehicle;
determining means for determining whether said accelerator pedal is in said released state in which said operating amount is smaller than a predetermined threshold close to zero;
first control means operated in response to a determination by said determining means that said accelerator pedal is in said released state, for increasing the engine brake force with an increase in said actual running speed of the vehicle detected by said vehicle speed sensor;
brake detecting means for detecting that said brake pedal of the vehicle is depressed; an
second control means operated in place of said first control means when said brake pedal is depressed, for controlling said engine brake force such that the engine brake force controlled by the second control means is larger than that controlled by said first control means.

10. An apparatus according to claim 9, further comprising desired-speed determining means for determining a desired running speed of the vehicle on the basis of said actual running speed of the vehicle detected by said vehicle speed detecting means, and wherein said first control means includes means for controlling an intake air quantity of said engine so as to maintain said actual running speed at said desired speed, for thereby increasing said engine brake force.

11. An apparatus according to claim 10, wherein said first control means includes a throttle valve, and an electronic device for controlling an opening of said throttle valve so as to feedback control said intake air quantity.

12. An apparatus according to claim 9, wherein said second control means includes means for substantially zeroing an intake air quantity of said engine when said brake pedal is depressed.

13. An apparatus according to claim 9, wherein said second control means includes means for shifting down said automatic transmission when said brake pedal is depressed.

14. An apparatus according to claim 13, wherein said second control means further includes means for substantially zeroing an intake air quantity of said engine when said brake pedal is depressed.

15. An apparatus according to claim 9, further comprising:
desired-speed determining means for determining whether said operating amount of the accelerator pedal detected by said accelerator position sensor is reduced below a predetermined threshold which is close to zero, and determining a desired speed of the vehicle on the basis of said actual running speed detected by said vehicle speed sensor; and
intake air control means for controlling an intake air quantity of said engine such that said actual running speed approaches said desired speed, said first control means operating said intake air control means to control said intake air quantity and thereby increase said engine brake force when said operating amount of said accelerator pedal is reduced below said predetermined threshold.

16. An apparatus according to claim 15, further comprising limiting means for limiting said intake air quantity controlled by said intake air control means, to a value not exceeding a reference value which is determined on the basis of said speed ration of the automatic transmission and said actual running speed of the vehicle, so as to permit said actual running speed to be maintained at said desired speed when the vehicle runs on a level road surface.

17. An apparatus according to claim 15, wherein said intake air control means includes means for determining a difference between said actual running speed of the vehicle and said desired speed, and means for determining said intake air quantity as a function of the determined difference.

18. An apparatus for controlling an engine brake force of a motor vehicle having an engine, an accelerator pedal, and an automatic transmission, said engine brake force being produced by said engine when said accelerator pedal is in a released state, said apparatus comprising:
an accelerator position sensor for detecting an operating amount of said accelerator pedal;
a vehicle speed sensor for detecting an actual running speed of the vehicle;
desired-speed determining means for determining whether said operating amount of the accelerator pedal detected by said accelerator position sensor is reduced below a predetermined threshold which is close to zero, and determining a desired speed of the vehicle on the basis of said actual running speed detected by said vehicle-speed sensor when said operating amount is reduced below said predetermined threshold;

engine brake control means for controlling said engine brake force so as to prevent said actual running speed of the vehicle detected by said vehicle speed sensor from exceeding said desired speed determined by said desired-speed determining means; and updating means for updating said desired speed of the vehicle on the basis of said actual running speed, when said actual running speed becomes smaller than said desired speed by more than a predetermined value.

19. An apparatus according to claim 18, wherein said engine brake control means includes intake air control means for controlling an intake air quantity of said engine such that said actual running speed coincides with said desired speed.

20. An apparatus according to claim 19, wherein said intake air control means includes means for determining a difference between said actual running speed of the vehicle and said desired speed, and means for determining said intake air quantity as a function of the determined difference.

21. An apparatus according to claim 19, wherein said intake air control means includes a throttle valve, and an electronic device for controlling an opening of said throttle valve so as to control said intake air quantity.

22. An apparatus according to claim 19, further comprising means for limiting said intake air quantity controlled by intake air control means, to a value not exceeding a reference value which is determined on the basis of said speed ratio of the automatic transmission and said actual running speed of the vehicle, so as to permit said actual running speed to be maintained at said desired speed when the vehicle runs on a level road surface.

23. An apparatus accord to claim 18, further comprising brake detecting means for detecting that said brake pedal of the vehicle is depressed, and wherein said engine brake control means includes:

first control means operated in response to a determination by said desired-speed determining means that said operating amount of said accelerator pedal is reduced below said predetermined threshold, for increasing the engine brake force with an increase in said actual running speed of the vehicle detected by said vehicle speed sensor; and second control means operated in place of said first control means when said brake pedal is depressed, for controlling said engine brake force such that the engine brake force controlled by the second control means is larger than that controlled by said first control means.

24. An apparatus for controlling an engine brake force of a motor vehicle having an engine, an accelerator pedal, a brake pedal, and an automatic transmission, said engine brake force being produced by said engine when said accelerator pedal is in a released state, said apparatus comprising:

an accelerator position sensor for detecting an operating amount of said accelerator pedal;

a vehicle speed sensor for detecting an actual running speed of the vehicle;

desired-speed determining means for determining whether said operating amount of the accelerator pedal detected by said accelerator position sensor is reduced below a predetermined threshold which is close to zero, and determining a desired speed of the vehicle on the basis of said actual running speed detected by said vehicle-speed sensor when said operating amount is reduced below said predetermined threshold;

engine brake control means for controlling said engine brake force so as to prevent said actual running speed of the vehicle detected by said vehicle speed sensor from exceeding said desired speed determined by said desired-speed determining means;

brake detecting means for detecting whether said brake pedal is depressed; and updating means operated when said brake pedal is depressed, for updating said desired speed of the vehicle on the basis of at least said actual running speed detected by said vehicle speed sensor when said brake pedal is released.

25. An apparatus according to claim 24, wherein said updating means updates said desired speed of the vehicle when said brake pedal is released.

26. An apparatus according to claim 24, wherein said updating means updates said desired speed of the vehicle while said brake pedal is held depressed.

27. An apparatus according to claim 24, wherein said engine brake control means includes intake air control means for controlling an intake air quantity of said engine such that said actual running speed coincides with said desired speed.

28. An apparatus according to claim 27, wherein said intake air control means includes means for determining a difference between said actual running speed of the vehicle and said desired speed, and means for determining said intake air quantity as a function of the determined difference.

29. An apparatus according to claim 27, wherein said intake air control means includes a throttle valve, and an electronic device for controlling an opening of said throttle valve so as to control said intake air quantity.

30. An apparatus according to claim 27, further comprising means for limiting said intake air quantity controlled by intake air control means, to a value not exceeding a reference value which is determined on the basis of said speed ratio of the automatic transmission and said actual running speed of the vehicle, so as to permit said actual running speed to be maintained at said desired speed when the vehicle runs on a level road surface.

31. An apparatus according to claim 24, further comprising brake detecting means for detecting that said brake pedal of the vehicle is depressed, and wherein said engine brake control means includes:

first control means operated in response to a determination by said desired-speed determining means that said operating amount of said accelerator pedal is reduced below said predetermined threshold, for increasing the engine brake force with an increase in said actual running speed of the vehicle detected by said vehicle speed sensor; and second control means operated in place of said first control means when said brake pedal is depressed, for controlling said engine brake force such that the engine brake force controlled by the second control means is larger than that controlled by said first control means.

* * * * *